(12) United States Patent
Altemose et al.

(10) Patent No.: US 11,684,811 B2
(45) Date of Patent: *Jun. 27, 2023

(54) SAFETY HARNESS MOTION DETECTOR SYSTEMS AND METHODS FOR USE

(71) Applicant: US SAFETY TECHNOLOGIES LLC, Fort Myers, FL (US)

(72) Inventors: George Altemose, Setauket, NY (US); Daniel W. Marino, Fort Myers, FL (US); John Gedde, Middle Island, NY (US)

(73) Assignee: US SAFETY TECHNOLOGIES LLC, Fort Myers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,274

(22) Filed: Jun. 17, 2021

(65) Prior Publication Data

US 2022/0146261 A1    May 12, 2022

Related U.S. Application Data

(63) Continuation of application No. 17/144,963, filed on Jan. 8, 2021, now Pat. No. 11,065,481, which is a (Continued)

(51) Int. Cl.
  *G08B 23/00* (2006.01)
  *A62B 35/00* (2006.01)
  (Continued)

(52) U.S. Cl.
  CPC ............ *A62B 35/0025* (2013.01); *G01C 5/06* (2013.01); *G08B 21/0272* (2013.01); *G08B 21/043* (2013.01)

(58) Field of Classification Search
  CPC .. A62B 35/0025; G01C 5/06; G08B 21/0272; G08B 21/043; G08B 21/24; G08B 21/0415
  (Continued)

(56) References Cited

U.S. PATENT DOCUMENTS 7,106,205 B2 *  9/2006  Graef ................. A62B 35/0012
                                                          340/687
7,753,861 B1    7/2010  Kahn et al.
(Continued)

FOREIGN PATENT DOCUMENTS

WO        2021236519        11/2021

OTHER PUBLICATIONS

Guardian Fall Protection, Product Name: Temper Anchor—Instruction Manual, Rev. N, <http://www.guardianfall.com> (submitted in related U.S. Appl. No. 16/878,324).
(Continued)

*Primary Examiner* — Anh V La
(74) *Attorney, Agent, or Firm* — Gardella Grace P.A.

(57) ABSTRACT

Systems and methods for monitoring elevations of a set of workers at a job site include reference devices for capturing barometric pressures at different installation elevations on a structure and portable barometric pressure sensors carried by the workers. An atmospheric pressure offset may be calculated using the reference barometric pressures and installation elevations. The atmospheric pressure offset may be applied to atmospheric pressure measurements captured by the barometric pressure sensors carried by the workers to determine worker elevations. The worker elevations may be converted to corresponding floors of the structure.

20 Claims, 14 Drawing Sheets

Related U.S. Application Data continuation-in-part of application No. 16/878,324, filed on May 19, 2020, now Pat. No. 10,909,831.

(51) Int. Cl.
  *G08B 21/04*  (2006.01)
  *G01C 5/06*  (2006.01)
  *G08B 21/02*  (2006.01)

(58) Field of Classification Search
  USPC ... 340/573.1, 573.7, 539.1, 573.3, 507, 517, 340/519, 521, 540, 541
  See application file for complete search history.

(56) References Cited

U.S. PATENT DOCUMENTS

| | | | |
|---|---|---|---|
| 8,325,053 B2* | 12/2012 | Flynt | A62B 35/0025 182/4 |
| 8,482,401 B2* | 7/2013 | Morino | A62B 35/0025 340/532 |
| 8,665,097 B2 | 3/2014 | Worthington et al. | |
| 9,089,723 B2 | 7/2015 | Bagnaro | |
| 9,511,245 B2 | 12/2016 | Moore, Jr. et al. | |
| 9,776,847 B2 | 10/2017 | Mondal et al. | |
| 10,496,045 B2 | 12/2019 | Hu et al. | |
| 10,909,831 B1 | 2/2021 | Altemose et al. | |
| 11,065,481 B1 | 7/2021 | Altemose et al. | |
| 2010/0231402 A1 | 9/2010 | Flynt et al. | |
| 2013/0076515 A1 | 3/2013 | Flynt et al. | |
| 2015/0027808 A1 | 1/2015 | Baillargeon et al. | |
| 2015/0265860 A1* | 9/2015 | Kennedy | A62B 35/0075 182/3 |
| 2015/0276521 A1 | 10/2015 | Moore, Jr. et al. | |
| 2016/0107007 A1 | 4/2016 | Pollard | |
| 2017/0169533 A1 | 6/2017 | O'Brien | |
| 2017/0193799 A1 | 7/2017 | Holub | |
| 2017/0309152 A1 | 10/2017 | Dinkins | |
| 2019/0160310 A1 | 5/2019 | Thompson | |
| 2022/0355133 A1 | 11/2022 | Altemose et al. | |

OTHER PUBLICATIONS

Guardian Fall Protection, Product Name: Vertical Lifeline Assembly (VLA)—Instruction Manual, Rev. I, <http://www.guardianfall.com> (submitted in related U.S. Appl. No. 16/878,324).

Guardian Fall Protection, Product Name: Velocity Harness—Instruction Manual, Rev. R, <http://www.guardianfall.com> (submitted in related U.S. Appl. No. 16/878,324).

Notice of Allowance issued in U.S. Appl. No. 16/878,324 dated Nov. 27, 2020. (submitted in related U.S. Appl. No. 17/350,274).

COREKINECT, JumpTrack, Specifications, p. 1 <www.corekinect.com> (submitted in related U.S. Appl. No. 17/350,274).

Notice of Allowance issued in U.S. Appl. No. 17/144,963 dated Mar. 19, 2021.

International Search Report and Written Opinion issued in PCT Application No. PCT/US2021/032768 dated Jun. 11, 2021.

Non-Final Office Action dated Aug. 18, 2022 in U.S. Appl. No. 17/870,708.

Notice of Allowance dated Dec. 7, 2022 in U.S. Appl. No. 17/870,708.

\* cited by examiner

SAFETY HARNESS MOTION DETECTOR SYSTEMS AND METHODS FOR USE

RELATED APPLICATIONS

This application is a continuation of and claims priority to U.S. patent application Ser. No. 17/144,963, entitled "Safety Harness Motion Detector Systems and Methods for Use," filed Jan. 8, 2021, which is a continuation-in-part of and claims priority to U.S. patent application Ser. No. 16/878,324, entitled "Safety Harness Motion Detector Systems and Methods for Use," filed May 19, 2020 (now U.S. Pat. No. 10,909,831, issued Feb. 2, 2021). All above identified applications are hereby incorporated by reference in their entireties.

BACKGROUND

During the housing construction process, in accordance with Occupational Safety and Health Administration (OSHA) guidelines, each worker is required to wear fall protection equipment including a body harness and a lanyard or lifeline that is releasably anchored to the building to protect against injury. One example of such fall protection equipment is a Velocity Harness and Vertical Lifeline Assembly (VLA) by Guardian Fall Protection of Mansfield, Mass. The VLA is designed to be fastened to a sturdy Temper Anchor on the building (e.g., connected to the roof during roofing). Since construction workers are frequently paid by piecework, and the anchored tether or lifeline is viewed as an impediment to speed, many workers elect to not wear the VLA in hopes of earning a higher hourly income. However, this presents a legal problem for the contractor, because the contractor is held legally responsible whenever a worker is found to be not wearing a VLA. Further, this presents a potential insurance hazard in the event of injury.

SUMMARY OF ILLUSTRATIVE EMBODIMENTS

Typically, a job site will have several roof workers, sometimes up to ten or even more. While technology exists for tracking on-the-go workers which can be used to identify locations of roofing teams, these solutions lack information regarding the motion status of the worker and the status of compliance with donning of safety equipment. The systems, methods, apparatus, circuit designs, and software algorithms described herein form a solution for enabling a roofing contractor to monitor compliance of workers on a job site with donning a safety harness assembly while working.

The systems, methods, apparatus, circuit designs, and software algorithms created by the inventors will enable a contractor to monitor roof workers at multiple job sites from a single application (e.g., smart device app, browser-based application, or portal to network-based monitoring platform) to verify that each worker is compliant in wearing necessary safety equipment. In the event that a worker is not wearing the requisite safety apparel, the contractor can take appropriate action, such as calling the worker by phone or sending a supervisor to the job site to resolve the problem.

In one aspect, the present disclosure relates to a Motion Detector Module (MDM) for attachment to the Vertical Lifeline Assembly (VLA) to ensure attachment of the VLA to the harness. For example, the MDM may be attached to the VLA close to an attachment point of the VLA to the harness. The MDM may contain a motion sensor, such as an accelerometer or gyroscope, for detecting physical motion of the VLA such as occurs while a worker is wearing a harness with attached VLA and engaging in the activity of installing shingles and performing other typical tasks required for building a roof. The MDM may contain a radio frequency transceiver, such as a Bluetooth or Wi-Fi transceiver, for sending information to a separate computing device. Alternatively, the MDM may contain a communications transceiver for transmitting information over a cable connection, such as an optical cable transceiver or a wire cable transceiver. The separate computing device, in some examples, may be a cell phone carried by a worker, a tablet computing device at the work site, or a communications box disposed at the work site. The cell phone, for example, may be executing an app that is configured to collect information from an MDM and forward the information via a network connection such as a cellular network connection or Wi-Fi connection to a coordinating application developed for contractor management of workers. The communications box, similarly, may collect information from a set of MDMs carried by workers at a job site and communicate this information, via a cellular network connection or Wi-Fi connection, to a management application installed by the contractor on a remote computing device. The management application will allow the contractor to track the performance status of the worker at the job site.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
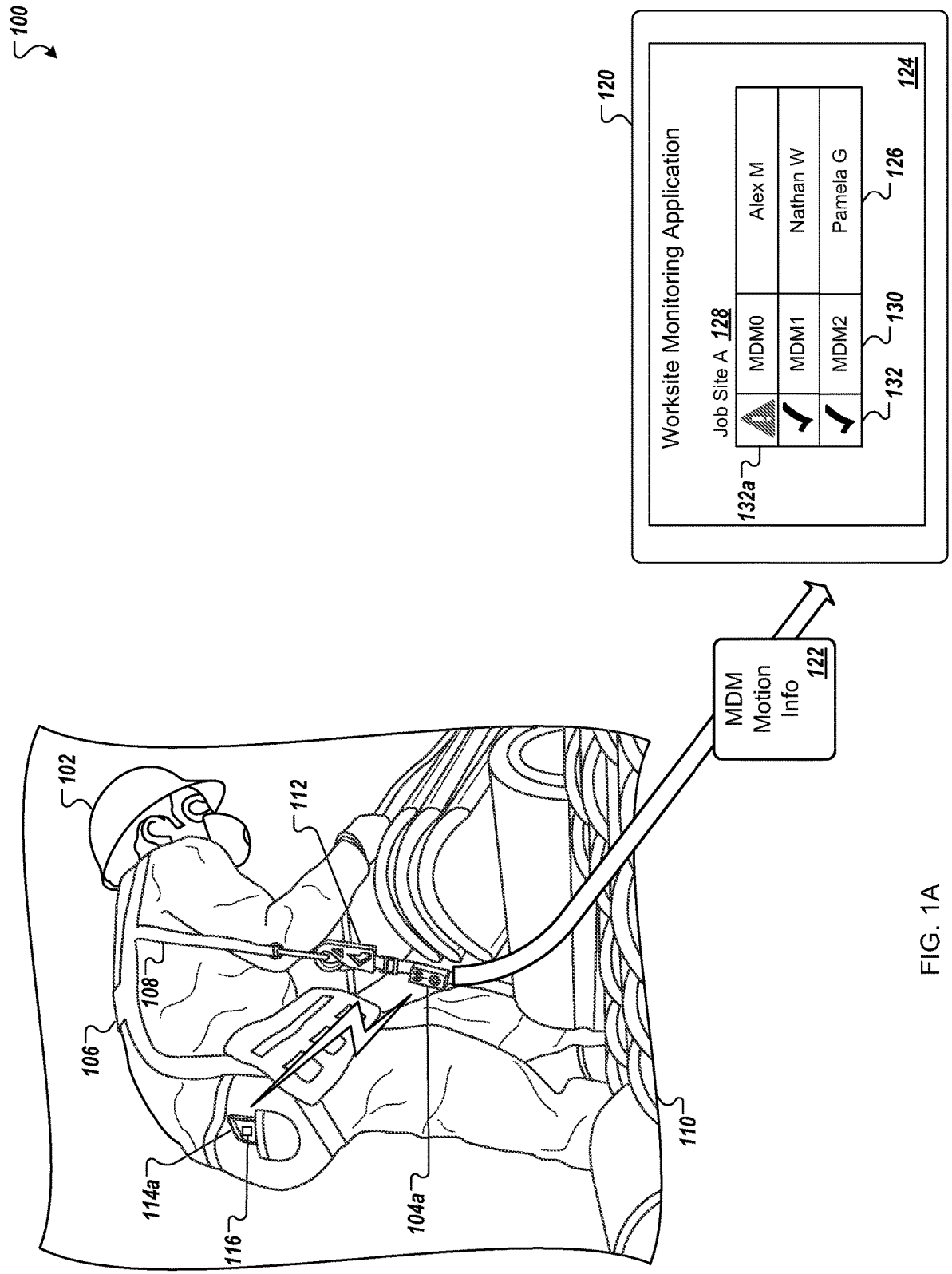
FIGS. 1A, 1B, and 1D are block diagrams of example systems for monitoring safety apparel compliance in a construction worker.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 1B:
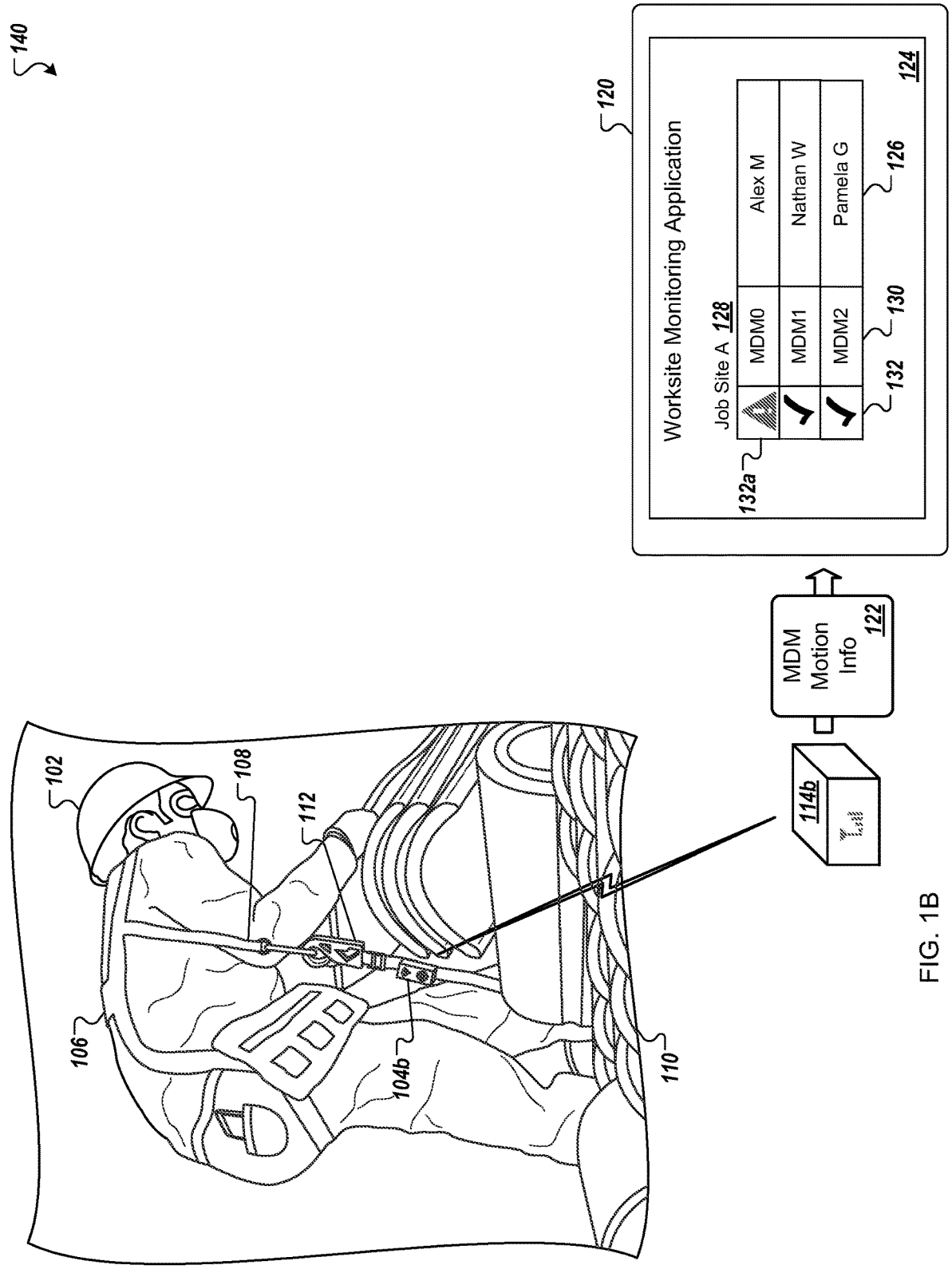

FIGS. 1A and 1B illustrate block diagrams of example systems 100, 140 for monitoring safety apparel compliance in a roofing worker 102 using a motion detection module (MDM) 104 attached to a component of the safety apparel. The MDM 104 may monitor motion in the component of the safety apparel and, upon lack of motion detection (e.g., the worker 102 is not wearing the safety apparel component), the MDM 104 may issue a short-range radio frequency (RF) communication via an interim communication unit 114 (e.g., cell phone, tablet computer, or other Wi-Fi or Ethernet-enabled communication device) to provide an alert to computing device 120 of a construction supervisor who may be remotely located from the job site. The worksite monitoring software application, for example, may be used and controlled by a contractor or manager. Further, the MDM 104 may issue a localized warning, for example via a speaker element of the MDM 104 or via the interim communication unit, to remind the worker 102 and/or to draw the attention of another worker at the job site.

In preferred embodiments, the MDM 104 has a durable exterior case designed to withstand rugged environmental conditions, including highly variable temperatures and rain, while the exterior case as well as the internal circuitry is designed to prevent damage to the components from dampness, overheating, shock and/or vibration. The exterior case of the MDM 104, in preferred embodiments, is designed to easily attach and remain locked in position to safety equipment such as a lifeline. For example, the MDM 104 may be tamper-resistant such that, after connection to the safety equipment, a worker cannot readily detach the MDM 104 and "trick" the system (e.g., place the MDM 104 in a pocket). However, since safety equipment such as lifelines have a limited period of utility, in preferred embodiments, the MDM 104 is further releasable and replaceable on another item of safety equipment.

In some implementations, the MDM 104 includes a tamper-resistant locking mechanism to releasably lock the MDM 104 to safety equipment such as a lifeline. The tamper-resistant locking mechanism may be designed to be simple for a manager to attach while requiring specialized (e.g., not commonplace) equipment and/or information to detach. The locking mechanism, in illustration, may function similar to a padlock or a combination lock. In another illustration, the locking mechanism may include an electronic lock triggerable using a communication signal generated by a worksite monitoring software application installed on a computing device including a short-range wireless antenna. In a further illustration, the locking mechanism may be a tamper-proof hardware-based locking mechanism such as a security screw, safety screw, pin, or rivet which can be set using a standard tool (e.g., screwdriver) but requires a specialized tool for removal. The locking mechanism may, for example, include a back plate that releasably connects to the MDM 104 using one or more tamper-proof locking mechanisms. In another example, the locking mechanism may include a clasp or clamp. The clasp or clamp itself, in some embodiments, is set in place using the tamper-proof hardware-based locking mechanism.

As shown in FIG. 1A, the worker 102 is wearing a safety harness 106. The safety harness 106 is tethered to a section of a roof 110 via a lifeline 108 connected at one end to the safety harness 106 and at the other end to a rope portion of an anchor point 112 on the roof 110. The MDM 104a, as illustrated, is connected to the anchor point 112 (e.g., below a releasable clamp). As the worker 102 tiles the roof 110, the lifeline 108, and thereby the anchor point 112, is jostled by the activity. The MDM 104a contains at least one motion detector for detecting the motion of the anchor point 112, thereby ensuring that the lifeline 108 is appropriately connected to the safety harness 106 and to the anchor point 112.

The MDM 104a, in some implementations, includes a radio frequency transceiver, such as a Bluetooth transceiver, for communicating with a portable computing device 114a carried by the worker. As illustrated, the portable computing device 114a is a smart phone. In other embodiments, the portable computing device 114a is a smart watch, tablet computer, or other Wi-Fi and/or Internet-enabled (e.g., cellular service-enabled) device. In further embodiments, the portable computing device 114a may be a two-way radio unit, a Bluetooth communications-enabled construction helmet, or a Bluetooth communications-enabled hearing protection headset. An application 116 executing on the portable computing device 114a, for example, may be configured to receive motion indicator messages (or messages indicating lack of motion) from the MDM 104a.

In some implementations, the application 116 executing on the portable computing device 114a intercepts an RF broadcast message transmitted by the RF transceiver of the MDM 104a or receives a directed RF communication from the MDM 104a and translates the message into an indication of motion or lack thereof. The application 116, in turn, issues a message 122 including motion information regarding the MDM 104a for receipt by a worksite monitoring application 124 executing on the construction supervisor's computing device 120. The message 122, for example, may be transmitted via Wi-Fi or cellular network for receipt by the computing device 120. The computing device 120 may be located, in some examples, at a different job site, in a main office, or another remote location.

The message, in some embodiments, includes additional information added by the application 116 such as, in some examples, a location of the portable computing device 114a (e.g., as obtained through a GPS receiver), an identifier of the worker associated with the portable computing device 114a, or movement information of the portable computing device 114a (e.g., as obtained through a GPS receiver) indicative, for example, of traveling to or from the work site.

A manager reviews information presented by the worksite monitoring application 124, in some implementations, to ensure compliance of a number of workers at one or more job sites. As illustrated, the worksite monitoring application 124 identifies a set of workers 126 at "job site A" 128 each having been allocated a MDM 130. Status symbols 132 identify that there is an alert condition 132a associated with MDM0, allocated to "Alex M".

In some implementations, beyond presenting information on the computing device 120, the worksite monitoring application 124 may issue one or more alerts to a supervisor such as, in some examples, a text message alert directed to a telephone number of the supervisor, an email alert directed to an email account of the supervisor, or an audible and/or haptic alert generated by the worksite monitoring application 124 on the computing device 120. Upon receiving such an alert, the supervisor may call the worker or another team member at the job site, visit the job site, or otherwise take action to ensure compliance with safety requirements at the job site.

Turning to FIG. 1B, in a second system 140, rather than communicating with the portable device 114a carried by the worker 102, in some embodiments, a MDM 104b is configured to communicate via a communications transceiver, such as an optical cable transceiver, a wire cable transceiver, or a short-range RF transceiver with a Central Communication Module (CCM) 114b positioned either in range of short range wireless transmitters of multiple MDMs at the job site or within distance for wired connection to optical cables or wired cables connected to each MDM.

Unlike the MDM 104a of FIG. 1A, in some embodiments, the transmission range of the MDM 104b is greater to reach the CCM 114b. For example, the MDM 104b may include a Wi-Fi transceiver for communicating with the CCM 114b. Thus, the CCM 114b may be located within Wi-Fi communication range of the MDM 104b.

In some implementations, the CCM 114b is connected to each MDM 104b via a wired connection for both communication and to provide power to each individual MDM 104b. In this manner, the MDM 104b may require no battery or a limited internal power supply.

The CCM 114b may be located in a central location at the job site such as, in some examples, in an attic of the building, on the ground proximate the building, or attached to the building (e.g., hanging from the front door knob like a realtor key box, etc.). In another example, the CCM 114b may be retained in or integrated into a portion of the construction equipment. For example, the CCM 114b may be in a vehicle belonging to the construction company or integrated into the dashboard computing system of the vehicle.

The CCM 114b, in some embodiments, includes a software application for gathering transmissions from multiple MDMs such as the MDM 104b and forwarding information from the MDMs 104b to the worksite monitoring application 124 on the computing device 120. The software application, similar to application 116 of FIG. 1A, may be configured to receive motion indicator messages (or messages indicating lack of motion) from the MDM 104b. The software application, for example, may be a portable computing device app such as a cell phone app. Further, the software application may be configured to receive motion indicator messages from up to twelve or more MDMs 104 located at a job site. The CCM 114b, in some embodiments, includes a cellular transceiver for forwarding MDM motion information 122 regarding the communications received from the MDM 104b (and other MDMs) to the worksite monitoring application 124. The MDM motion information 122 may include one or more transmissions as received from the MDM 104b. In other examples, the MDM motion information 122 includes metrics derived from the signals supplied by the MDM 104b. The MDM motion information 122 may include additional information such as, in some examples, location information derived from a position sensor of the CCM 114b (e.g., GPS receiver), motion information regarding motion of the CCM 114b (e.g., indicating the CCM 114b is on the way to or returning from the job site rather than being positioned at the job site), or identification of individuals allocated each MDM, such as the MDM 104b. For example, a supervisor may supply information, via a user interface of the CCM 114b or another portable computing device in communication with the CCM 114b, linking a particular MDM 104b to a particular individual.

In some embodiments, the CCM 114b is designed as a durable, weather-resistant communications box for placement proximate the building. The CCM 114b, for example, may include only simple I/O elements (e.g., power button, lighted status indicator, etc.) or no I/O elements (e.g., a black box configured for wireless communication and setup by a separate computing device such as a smart phone application). In other implementations, the CCM 114b is a portable computing device running an application for communicating with MDMs such as the MDM 104b. The portable computing device may be secured in a durable, weather-resistant carrier.

Figure 1C:
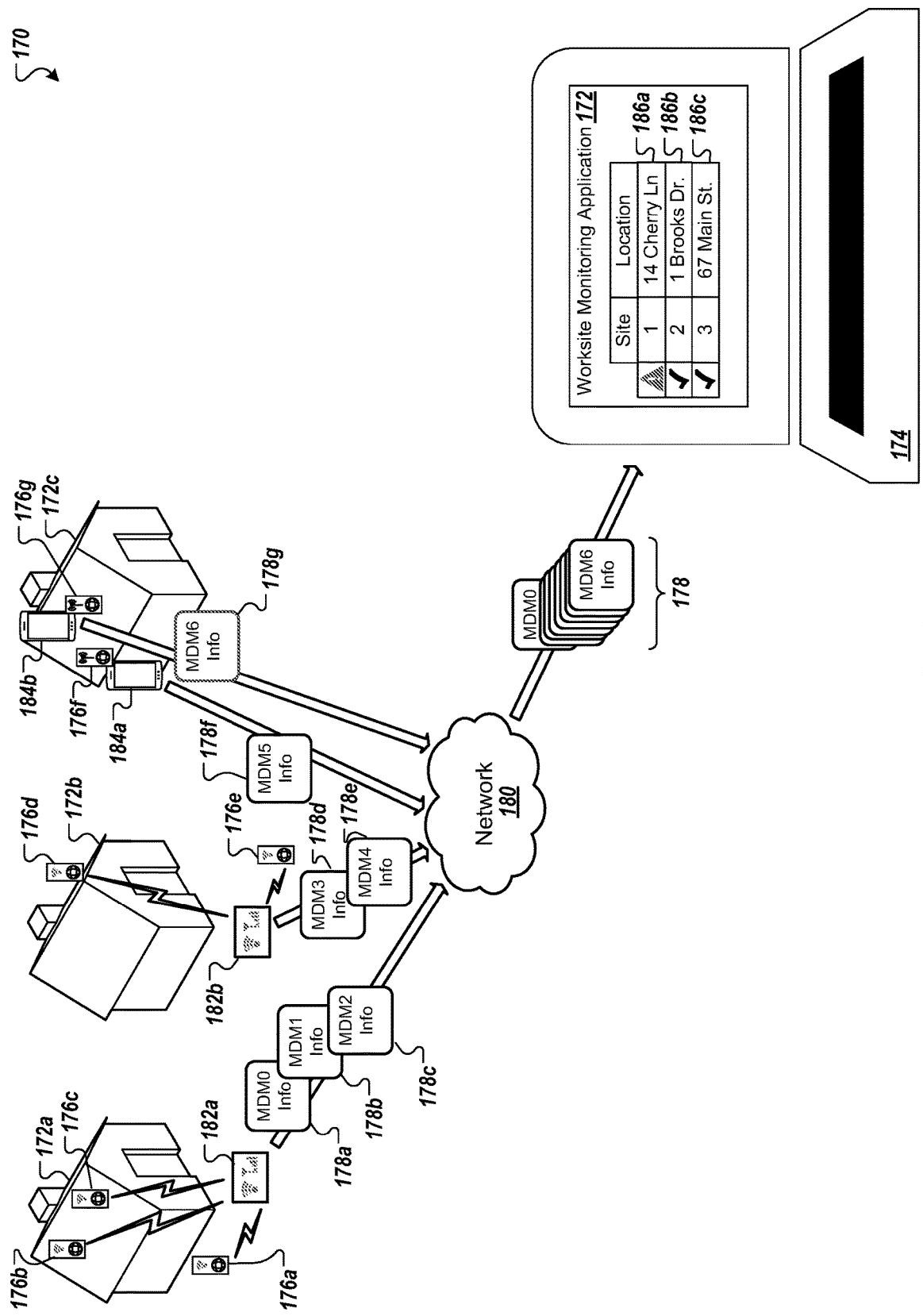
FIG. 1C is a block diagram of an example system for monitoring safety apparel compliance in multiple construction workers at multiple job sites.

Turning to FIG. 1C, a block diagram illustrates an example system 170 for monitoring activity at a number of job sites 172*a-c* via a worksite monitoring application 172 executing on a supervisor's computing device 174. Workers at each job site 172*a-c* may be provided individual MDMs 176 attached to lifelines, for example as illustrated in FIGS. 1A and 1B. The MDMs 176, as illustrated, may issue communications received by a CCM 182*a,b* (e.g., via Wi-Fi) or portable computing device 184*a,b* (e.g., via Bluetooth). The CCM 182*a,b* and portable computing devices 184*a,b* then forward MDM information transmissions 178*a-g* to the worksite monitoring application 172 via a network 180 (e.g., the Internet, a cellular communications network, etc.). The communications, for example, may be provided from the MDM 176 to the CCM 182 or portable computing device 184 and therefrom to the supervisor computing device 174 via the network 180 as described above in relation to FIGS. 1A and 1B. Although illustrated as a block of information transmissions 178 traveling through the network 180 to the supervisor computing device 174, this illustration is for convenience purposes only, and transmissions may be issued at different times from different CCMs 182 and/or portable computing devices 184 of the system 170.

Although illustrated as a mixed system supporting communications from both portable computing devices 184 and CCMs 182, in other implementations, all job sites 172*a-c* may either be issued CCMs 182 with Wi-Fi enabled MDMs 176 or Bluetooth-enabled MDMs 176 for use with personal computing devices (e.g., workers' smart phones).

As illustrated at a first job site 172*a* (e.g., row 186*a* of a graphical user interface of the worksite monitoring application 172 presented on a display of the supervisor computing device 174), two MDMs 176*b*, 176*c* are positioned on a roof top of the house (e.g., 14 Cherry Lane), while a third MDM 176*a* is positioned on the ground next to the house. A lifeline having MDM 176*a* attached to it, for example, may have been left by a worker who is working on the roof of the house without appropriate safety equipment. As illustrated on the supervisor computing device 174, an alert is presented in the first row 186*a* associated with the job site 172*a*, identifying that the MDM 176*a* is not in motion.

A similar positioning is illustrated at a second job site 172*b*, where MDM 176*e* is illustrated as being in a position on the ground away from the house but within range of a CCM 182*b*. However, in this circumstance, the worker may be equipped with a lifeline and accessing additional roofing materials to transport to the roof, since the worksite monitoring application 172 is not identifying an alert in this situation.

In some implementations, a supervisor at the computing device 174 selects one of the rows 186*a-c* to obtain a user interface presentation similar to the GUI illustrated in FIGS. 1A and 1B of the worksite monitoring application 124.

Figure 1D:
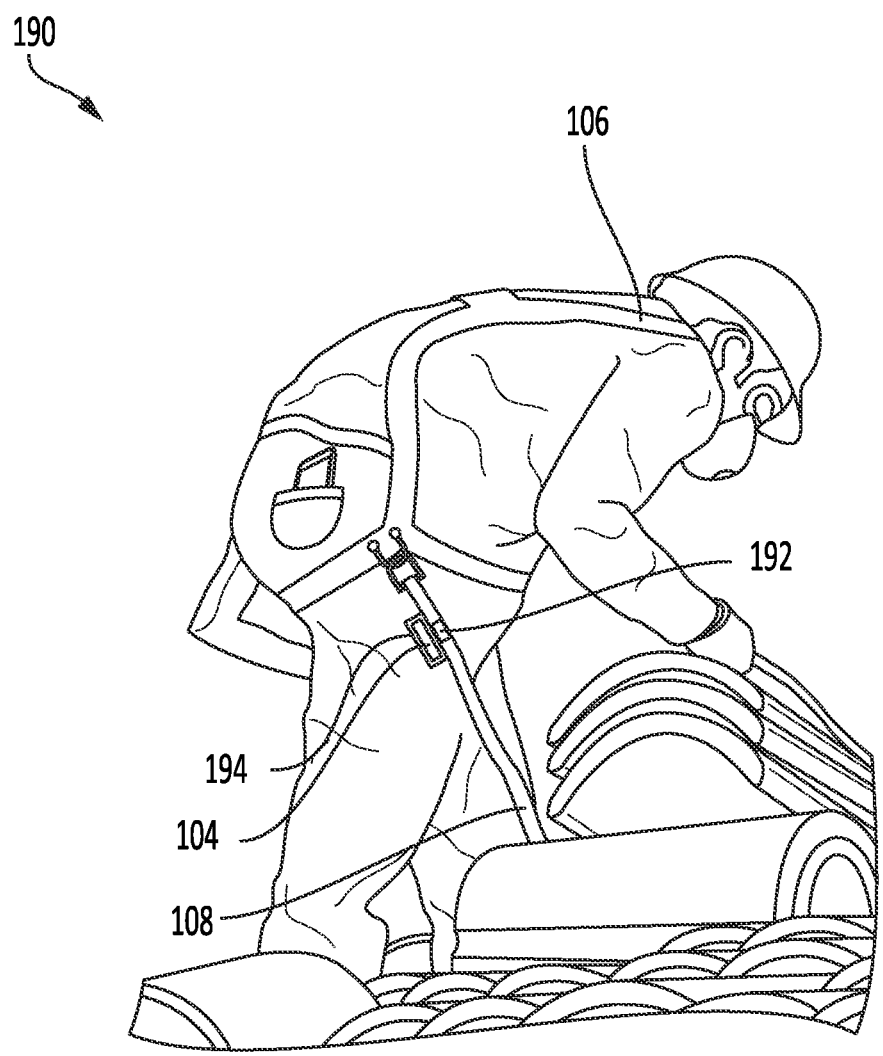
Figure 8:
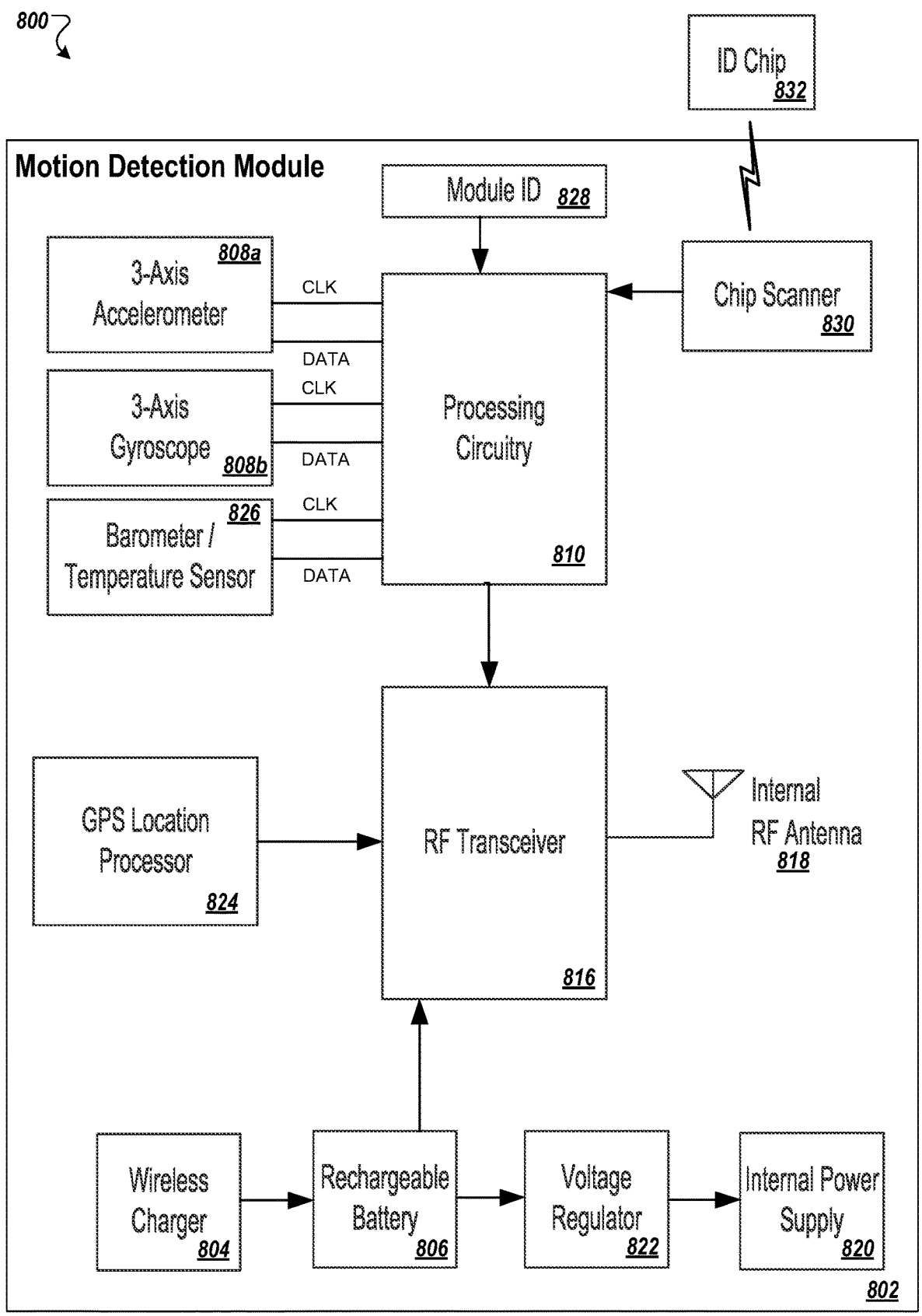
FIG. 8 is a block diagram of a schematic circuit layout for an example motion detection module with elevation detection.

Turning to FIG. 1D, in some implementations, the MDM 104 is releasably positioned in a holder 194, such as a pocket, that is attached to or built into the lifeline 108. Releasably connecting the MDM 104, for example, may provide the opportunity for easy charging, for example by removing all MDMs 104 from harnesses and arranging them in a charging pod or them setting on a wireless charging pad when not in use. For example, as illustrated in FIG. 8, MDM 802 includes a wireless charger 804 for charging a rechargeable battery 806. The power provided by the rechargeable battery 806 may then be fed into a voltage regulator 822 for powering an internal power supply 820. The functionality of the internal power supply and voltage regulator, in an illustrative example, are discussed in relation to the rechargeable battery 306, internal power supply 320, and A/D converter 322 of FIG. 3 as well as the rechargeable battery 426 and internal power supply 430 of FIG. 4. Rather than physically locking the MDM 104 into position, in such embodiments, the lifeline 108 or holder 194 includes an identification element 192 for detecting insertion of the MDM 104 into the holder 194. The identification element 192 may be fixed upon or within the lifeline 108. In some examples, the identification element 192 is mounted within the holder 194 with adhesive or epoxy.

In some implementations, the MDM 104 includes a sensor or scanner for obtaining information from the identification element 192. As illustrated in FIG. 8, in some embodiments, a chip scanner 830 is provided in the MDM 802 for scanning an identification chip 832 within the holder 194. The information scanned by the chip scanner 830 is then provided to processing circuitry 810 for analysis. For example, the MDM 104 may include a radio frequency (RF) sensor, and the identification element 192 may be a passive radio frequency (RF) tag or microchip programmed with identification information. In another example, the identification element 192 may be a microchip with a contact pin interface, such as a chip commonly used in credit cards, and the MDM 104 may include a chip reader. Further to this example, the holder 194 may be configured to accept the MDM 104 in a certain orientation to assure contact between the chip reader and the identification element 192. In other implementations, the MDM 104 may include a contactless scanner, such as a laser scanner, and the holder 194 may be configured to accept the MDM 104 in a certain orientation to ensure alignment between the scanner and the identification element 192.

In some implementations, the identification element 192 includes an identification code, such as a multi-digit numerical code. The identification element 192, in further examples, may include a job site code, a contractor group code, and/or a type code indicating a type of safety harness. The identification element 192 may be programmable, for example using a software application installed by a contractor, to store information that uniquely identifies the safety harness.

Returning to FIG. 1C, in some implementations, the MDM information 178 includes at least a portion of the identification information read by each MDM 176 from a corresponding identification element 192. A portion of the identification information, for example, may be visible to the contractor at the worksite monitoring application 172.

Figure 2A:
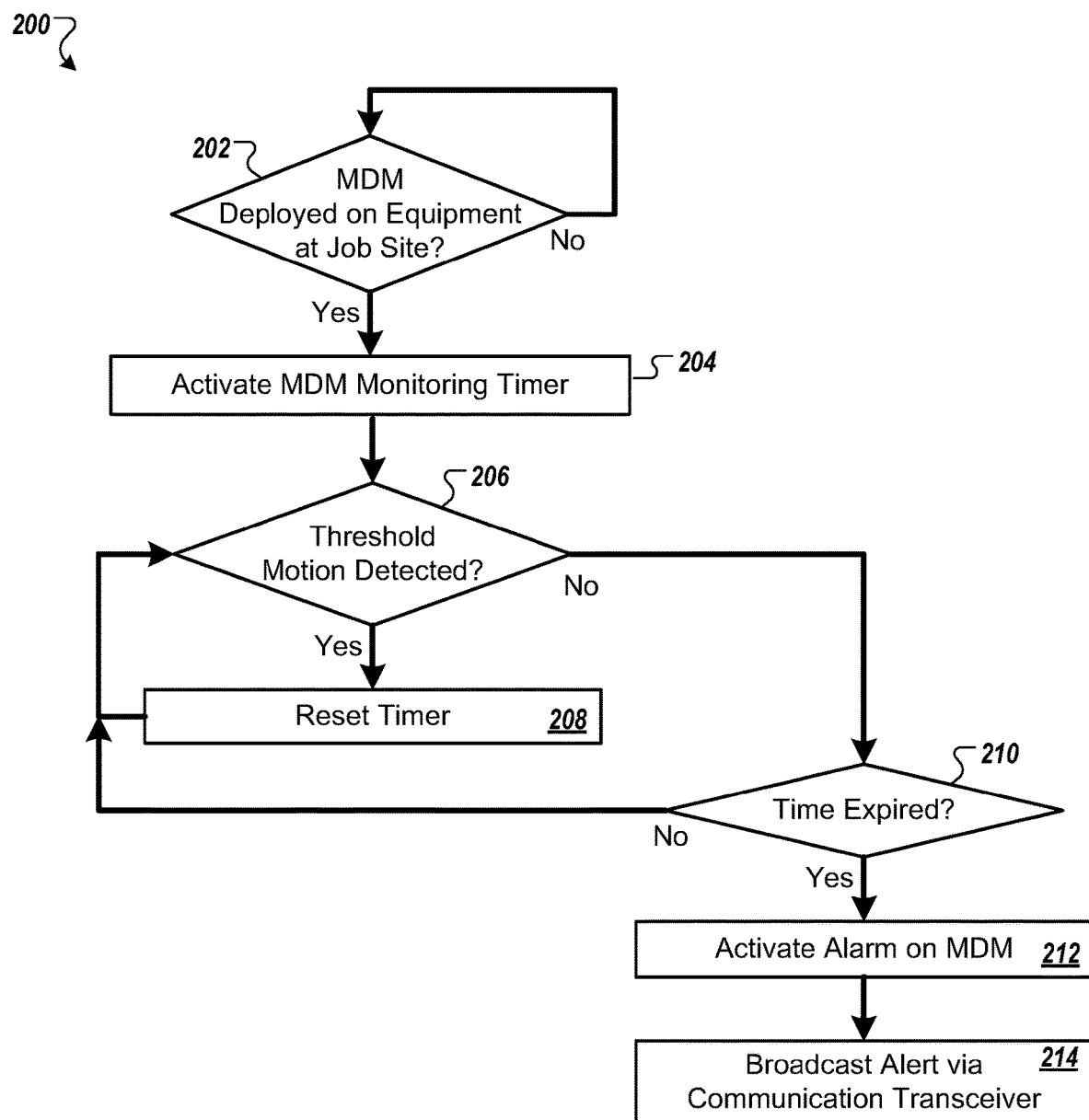
FIGS. 2A-C are flow charts of example methods for monitoring safety apparel compliance in a construction worker.

Turning to FIG. 2A, a flow chart illustrates an example method 200 for detecting motion using an MDM such as the MDM 104*a* of FIG. 1A, the MDM 104*b* of FIG. 1B, or the MDMs 176 of FIG. 1C. The method 200, for example, may be performed at least in part by example circuitry illustrated in FIG. 3, FIG. 4, and/or FIG. 8, described in greater detail below.

Figure 3:
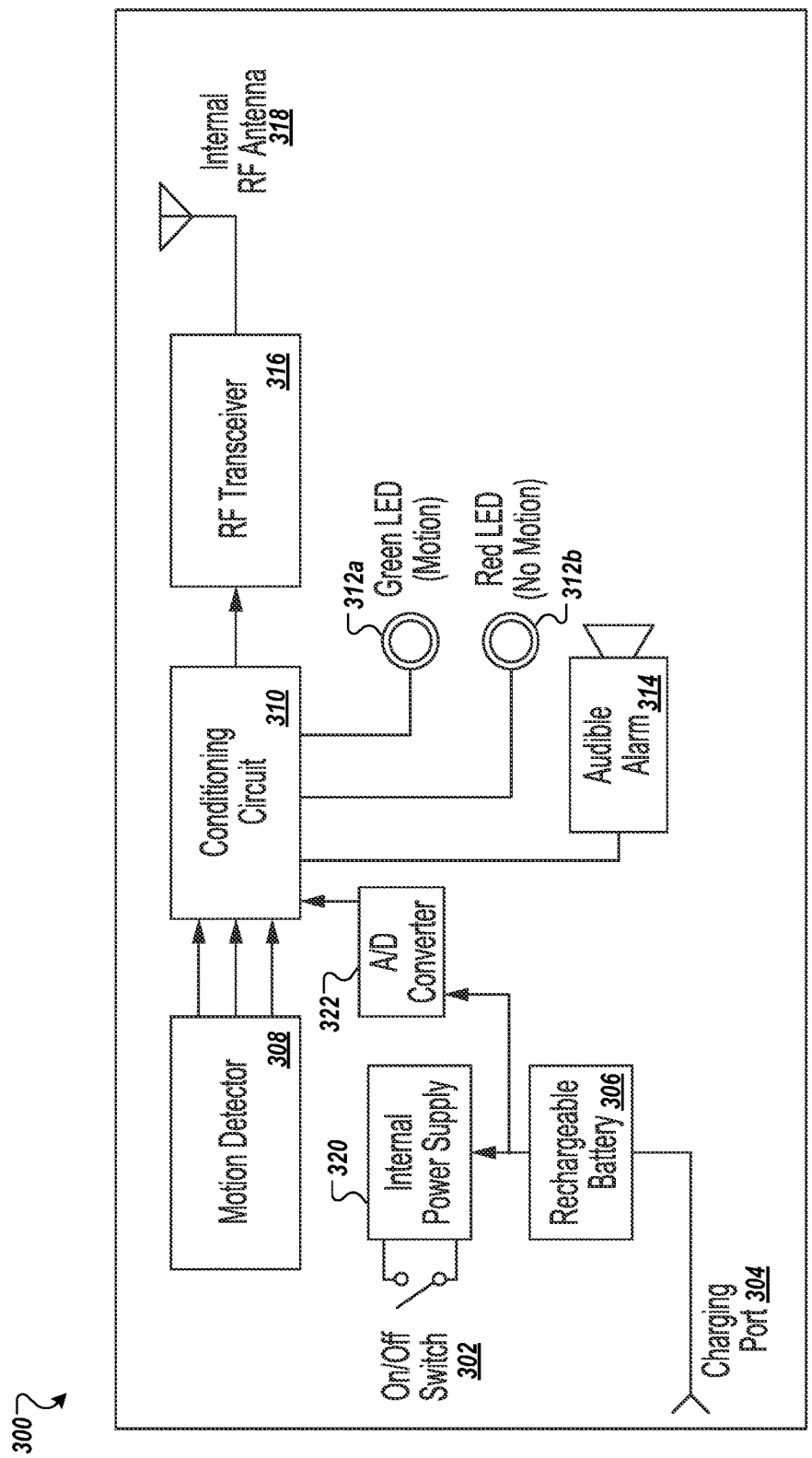
FIG. 3 is a block diagram of a schematic circuit layout for an example motion detection module.

In some implementations, the method 200 begins with determining whether the MDM is deployed at the job site (202). For example, the MDM may be powered off or disabled during storage and transit to conserve battery. The MDM, for example, may be powered by one or more off-the-shelf batteries, such as AA batteries. In another example, the MDM may be powered by a replaceable, rechargeable battery or battery unit. Thus, determining deployment may be as simple as being powered on. For example, as illustrated in FIG. 3, a block diagram of example MDM circuits illustrates an on/off switch 302 for powering the MDM 300. Conversely, the MDM may be connected to a charging unit during storage to recharge a rechargeable battery, such as a lithium-ion battery or cell phone battery. Thus, determining deployment may involve determining the charging port lacks connection to a power source. For example, as illustrated in FIG. 3, a charging port 304 provides a conduit for charging a rechargeable battery 306 of the example MDM 300 that supplies power to an internal power supply 320. The internal power supply 320, in turn, may power the circuit via an A/D converter 322.

In some embodiments, a Wi-Fi enabled MDM may wake upon recognizing availability of a CCM, such as the CCM 114b of FIG. 1B. The MDM, for example, may be designed to periodically ping for a response by a CCM. In other embodiments, the process may begin with the MDM detecting motion (e.g., when it is first loaded up for transport to the job site). For example, as illustrated in FIG. 3 and FIG. 8, the example MDM includes a motion detector 308 (808) such as an accelerometer 808a or a gyroscope 808b for detecting movement of the lifeline the MDM is attached to.

In some implementations, the MDM activates a monitoring timer (204). The monitoring timer may be set to a threshold period of time for determining whether or not a worker is wearing the lifeline to which the MDM is attached. For example, while a worker may stand still periodically, a lack of substantial motion for a threshold period of time may be indicative of the lifeline having been left off of the worker's safety harness. The threshold period of time, in some examples, may be at least 10 seconds, between 10 seconds and 15 seconds, or between 15 and 20 seconds. Substantial motion, for example, may relate to motion beyond mere vibrational motion of lying on a running vehicle, a roof being worked on, or another surface which may be jolted, bounced, or otherwise moved from time to time. As illustrated in FIG. 3, a conditioning circuit 310 (e.g., processing circuitry 810 of FIG. 8) may be used to translate signals from the motion detector 308 into indications of motion or no motion (e.g., as visually presented, in some embodiments, using indicator lamps 312a, b). The motion detector 308, in a preferred embodiment, includes a microelectromechanical (MEMS) accelerometer. In other embodiments, the motion detector includes a MEMS gyroscope. A MEMS gyroscope, for example, has a better low frequency response but is noisier than an accelerometer. In further embodiments, the motion detector 308 includes a mercury-filled tube or a container with a floating conductive ball that touches contacts.

If threshold motion is detected (206), in some implementations, the timer is reset (208). Conversely, if threshold motion is not detected (206) for an entire length of the monitoring timer (210), in some implementations, an alarm is activated on the MDM (212). The alarm, for example, may include an audible alarm, such as an audible alarm 314 of the example MDM 300 of FIG. 3. In further examples, the alarm may include a haptic alarm such that a worker may sense the alarm in a noisy work environment and/or a visual alarm, such as a flashing light display, an internal or external glowing light (e.g., LED strip that modifies a look of the MDM 300).

In some implementations, the MDM broadcasts an alert via a communications transceiver (214) regarding lack of motion. The alert, as described in relation to FIG. 1A, may be a Bluetooth communication intercepted by a portable computing device 114a. In another example, the alert may be a Wi-Fi communication received by a CCM 114b, as described in relation to FIG. 1B. In a further example, the alert may be a communication received by the CCM 114b via a physical connection, such as an optical fiber or wired cable. As illustrated in FIG. 3, the alert may be transmitted by a radio frequency transceiver 316 via an internal RF antenna 318 (e.g., transceiver 816 and antenna 818 of FIG. 8).

Although described as a particular series of operations, in other implementations, steps of the method 200 may be performed in a different order, or certain steps may be performed in parallel. For example, the alarm may be activated on the MDM (212) at the same time that the alert is broadcast via the short-range wireless communication (214). Additionally, one or more steps may be removed or added without altering the intent of the method 200. For example, the MDM may activate upon power switch activation (204) without determining (202) if the MDM is deployed at a job site. In a further example, rather than or in addition to broadcasting an alert via the communications transceiver (214), in other embodiments, the MDM may broadcast a confirmation of motion periodically via short-range wireless communication. For example, while the CCM may receive alerts regarding MDMs not in motion (e.g., the system configuration of FIG. 1B), when the lifeline has been left unworn by a worker, the MDM may be out of range of Bluetooth communication with the worker's cell phone and, thus, the broadcast alert (214) may never be received in the system configuration of FIG. 1A. Therefore, in the system of FIG. 1A, the MDM may instead periodically (e.g., once every timer cycle) indicate that it is in active motion. Therefore, when the worksite monitoring application 124 receives no indication from the MDM 104a of FIG. 1A, the worksite monitoring application 124 may assume that the lifeline 108 is not in use. Other modifications of the method 200 are possible.

Figure 2B:
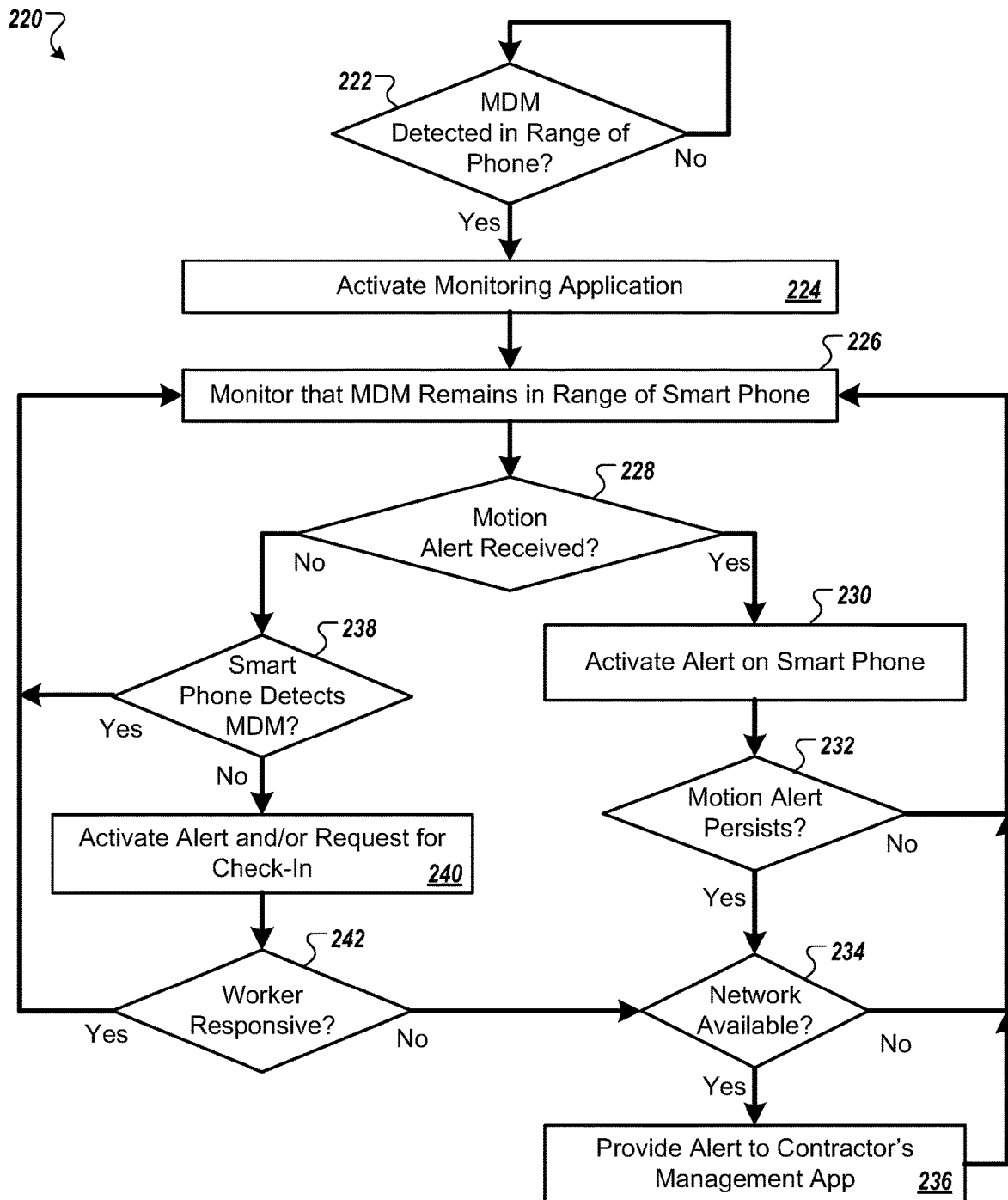

Turning to FIG. 2B, a flow chart illustrates an example method 220 for monitoring signals from a MDM using an application executing on a smart phone type device. The application may be installed by or on behalf of an employer for assuring compliance of a worker with donning required safety equipment. The method 220, for example, may be executed at least in part by the portable computing device 114a of FIG. 1A. Although described in relation to a smart phone, in other embodiments, the portable computing device may be a smart watch, Bluetooth-enabled headset, Bluetooth-enabled two-way radio, or other construction site communication equipment configured to execute an application to relay information to a worksite management system.

In some implementations, the method 220 begins with detecting that an MDM is within range of a short-range wireless receiver of the smart phone (222). For example, the application may detect a short-range wireless signal such as a Bluetooth broadcast from the MDM's antenna. The antenna, for example, may be the internal RF antenna 318 of the MDM 300 of FIG. 3 or the RF antenna 818 of the MDM 802 of FIG. 8.

In some implementations, the monitoring application is activated on the smart phone upon detecting the MDM (224). The monitoring application, for example, may associate an identifier received from the short-range wireless broadcast with the holder of the smart phone. In this manner, the monitoring application may proceed to monitor for signals from a particular MDM, thus avoiding reporting information regarding a nearby MDM of two workers in close proximity. In another example, the monitoring application may increase a listening period for detecting a short-range wireless signal from the MDM from a wake-up period to a monitor period. In a further example, the monitoring application may begin a timer tracking a length of time without receiving a signal from the MDM (e.g., a signal carrying a same identifier as the original MDM signal).

In some implementations, the MDM is monitored for remaining in range of the smart phone (226). Further to the example above, the application may ensure that one or more broadcast signals from the MDM are detected within the monitoring period established by the monitoring application's timer.

In some implementations, a motion alert is received from the MDM (228). The MDM may be within range of the smart phone while the safety equipment is not being properly worn by the worker. For example, the worker may have set the lifeline on the roof and proceeded to work proximate to the lifeline. Alternatively, the worker may have been still for a threshold period of time for the motion alert to activate despite the worker being properly attired in safety equipment. The threshold period of time, in some examples, may be at least 10 seconds, between 10 seconds and 15 seconds, or between 15 and 20 seconds.

After receipt of the motion alert (228), in some implementations, an alert is activated on the smart phone (230). For example, the monitoring application may activate an audible alarm and/or a haptic output to provide the worker with a reminder to connect the lifeline to the harness. A volume of the alert may be loud enough to draw attention from nearby workers, such as a lead worker or supervisor on the job. Further, a visual reminder may be displayed on the screen so that, upon reviewing the cell phone, the worker is presented with a reminder to attach the lifeline to the safety harness.

In some implementations, if the motion alert persists (232) after providing the worker with the alert, it is determined whether a network connection is available (234). The network, for example, may be a Wi-Fi network or cellular network connection to the Internet. The network, for example, may be the network 180 of FIG. 1C. If no network connection is available at the time (234), the method 220 may continue to monitor for the MDM within range of the smartphone (226). At times, a job site may be outside a range of a worker's cellular service. In these circumstances, there may be no opportunity for providing real-time alerts. Alternatively, there may be a temporary loss of service, for example due to a local cellular network failure.

If a network connection is available (234), the alert is provided to a management application (236) for review by a contractor or other supervising personnel. The management application, for example, may be the worksite monitoring application 124 described in relation to FIGS. 1A and 1B or the worksite monitoring application 172 described in relation to FIG. 1C. The management application, further, may issue an alert to the contractor or other management personnel through another communication means, such as email or text message.

In some implementations, after providing the alert (236), the method 220 returns to monitoring for signals from the MDM (226).

In some implementations, if no motion alert is received within a threshold period of time (228), yet the smart phone continues to detect signals from the MDM (238), the method 220 continues to monitor for signals from the MDM (226).

However, in some implementations, if no motion alert is received and the smart phone ceases to detect the MDM (238), an alert and/or a request for check-in is activated (240). The alert and/or request may be activated after a threshold period of time without detecting a signal from the MDM. The threshold period of time, in some examples, may be at least 5 seconds, between 5 seconds and 10 seconds, or between 10 and 20 seconds. The alert, in some examples, may include an audible alarm and/or haptic output for drawing the worker's attention to the phone. The alert, for example, may include a ringtone or shrill alarm tone drawing the worker's attention to the phone. Further, a visual request for response or check-in may be displayed on the screen so that, upon reviewing the cell phone, the worker is presented with a reminder to attach the lifeline to the safety harness and/or a request to submit a reason for the removal of the lifeline (e.g., bathroom break, lunch break, trip to gather additional materials, etc.). For example, the worker may be provided a number of selectable reasons for the removal of the MDM.

In some implementations, if the worker does not respond to the alert (242) and a network is available (234), an alert is provided to the contractor's management application (236) as described above. The worker may be deemed to have failed to respond, for example, if no motion is detected from the lifeline for a threshold period of time and the worker did not submit a valid response for the lifeline having been removed. The threshold period of time, in some examples, may be at least 2 minutes, at least 3 minutes, or between 3 minutes and 5 minutes. In other examples, the threshold period of time may be at least 10 minutes, between ten minutes and 15 minutes, or over 15 minutes. The threshold period of time, in some embodiments, is a user-configurable parameter. For example, a contractor or manager may choose a reasonable period of time for flagging a failure of a worker to respond.

If, instead, the worker responded appropriately (242), in some implementations, the method 220 returns to monitoring for signals from the MDM (226).

Although described as a particular series of operations, in other implementations, steps of the method 220 may be performed in a different order, or certain steps may be performed in parallel. For example, in other implementations, the alert is provided to the management application (236) at the same time that the alert is activated on the smart phone (230). Additionally, one or more steps may be removed or added without altering the intent of the method 220. For example, in some embodiments, rather than or in addition to activating an alert and/or requesting a check-in (240), a current location of the smart phone is detected to determine whether the smart phone is within a geo-fenced region of the job site (e.g., on or next to the building) as opposed to a separate location (e.g., in truck eating lunch, gathering additional equipment or materials, etc.). In another example, in other embodiments, whenever an alert fails to be issued due to network unavailability (234), the alert is maintained by the application for later transmission (236) to the management application. For example, the method 220 may periodically attempt re-sending the alert, even after a work period (e.g., when the smart phone returns to cellular service range when driving back from a job site) to ensure the management application is up to date regarding non-compliance events. Other modifications of the method 220 are possible.

Figure 2C:
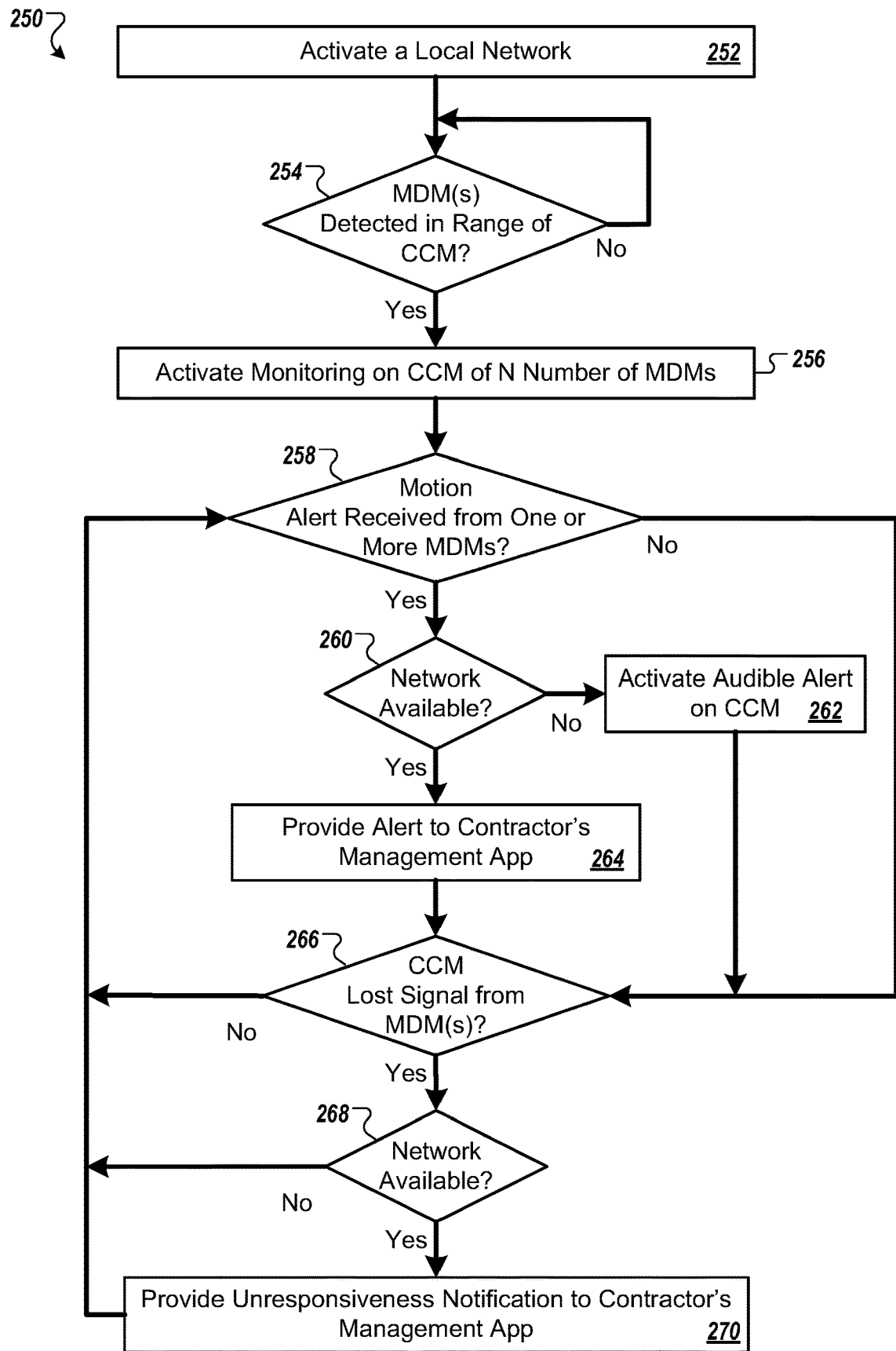

Turning to FIG. 2C, a flow chart illustrates an example method 250 for monitoring signals from an MDM using an application executing on a central communication module (CCM). The application may be installed by or on behalf of an employer for assuring compliance of one or more workers with donning required safety equipment. The method 250, for example, may be executed at least in part by the CCM 114b of FIG. 1B.

In some implementations, the method 250 begins with activating a local network (252). For example, the CCM may function as a Wi-Fi hot spot for establishing communications between the CCM and a set of MDMs within range of the CCM. In another example, the CCM may activate a Zigbee network or other localized IOT network with one or more in-range MDMs. Activating the local network may further involve issuing a broadcast request for response from one or more in-range MDMs.

In some implementations, if one or more MDMs are detected within range (254), monitoring is activated for the N number of MDMs (256). The CCM may detect a short-range wireless signal such as a Wi-Fi signal from the MDMs, for example, as described in relation to the CCM 114b of FIG. 1B detecting a signal from the MDM 104b. The signal may identify a particular MDM using a device identifier. Upon identifying the signal, the MDM may activate a timer for monitoring continued broadcasts from each MDM of the N number of MDMs detected. The timer, for example, may be set to a threshold period of time such as, in some examples, less than 5 seconds, between 5 and 10 seconds, or up to 20 seconds. In other implementations, rather than activating monitoring a broadcast, the MDM sets a polling period for actively polling each MDM to ensure the MDM continues to be within range of the CCM.

In some implementations, a motion alert is received from one or more of the MDMs (258). The motion alert, for example, may be broadcast as described in relation to step 214 of FIG. 2A. The motion alert, in one example, is issued by the RF transceiver 316 of FIG. 3 via the internal RF antenna 318 (e.g., the transceiver 816 and RF antenna 818 of FIG. 8).

In some implementations, if a network is available (260), an alert is provided to a management application (264). The network, for example, may be a Wi-Fi network or cellular network connection to the Internet. The network, for example, may be the network 180 of FIG. 1C. If no network connection is available at the time (260), an audible alert may be activated on the CCM (262). At times, a job site may be outside a range of cellular service for the CCM, or a local Wi-Fi data connection may be unavailable. Alternatively, there may be a temporary loss of service, for example due to a local cellular network failure. In these circumstances, there may be no opportunity for providing real-time alerts. An audible alert may provide local recognition to the problem. The audible alert, for example, may be activated by a speaker element of the CCM. The audible alert may issue for a period of time. Conversely, the audible alert may issue until one of the workers deactivates the alert through a control button feature on the CCM.

If, instead, the network is available (260), in some implementations, the alert is provided to a management application (264) for review by a contractor or other supervising personnel. The management application, for example, may be the worksite monitoring application 124 described in relation to FIGS. 1A and 1B or the worksite monitoring application 172 described in relation to FIG. 1C. The alert may be included in MDM motion information 122. The alert, in some embodiments, includes information such as, in some examples, a location of the CCM (e.g., as obtained through a GPS receiver), an identifier of the MDM associated with the alert, and/or movement information of the CCM (e.g., as obtained through a GPS receiver or accelerometer) indicative, for example, of traveling to or from the work site. The management application, further, may issue an alert to the contractor or other management personnel through another communication means, such as email or text message.

In some implementations, whether or not a motion alert was received (258) and whether or not the network is available (260), it is determined whether the signal from one or more of the MDMs was lost (266). For example, the CCM may fail to receive poll responses and/or broadcasts from one or more of the MDMs. This may indicate, in some examples, that the MDM is out of range of the CCM, powered off, or malfunctioning.

If no signal has been received from one or more of the MDMs (266), in some implementations, it is determined whether a network connection is available (268). The network, for example, may be a Wi-Fi network or cellular network connection to the Internet. The network, for example, may be the network 180 of FIG. 1C. If the network connection is available (268), in some implementations, an unresponsiveness notification is provided to the contractor's management application (270) for review by a contractor or other supervising personnel. The management application, for example, may be the worksite monitoring application 124 described in relation to FIGS. 1A and 1B or the worksite monitoring application 172 described in relation to FIG. 1C. The unresponsiveness notification, in some embodiments, includes information such as, in some examples, a location of the CCM (e.g., as obtained through a GPS receiver), an identifier of the MDM associated with the alert, a time of last signal received from the MDM, and/or movement information of the CCM (e.g., as obtained through a GPS receiver or accelerometer) indicative, for example, of traveling to or from the work site. The management application, further, may issue a notification to the contractor or other management personnel through another communication means, such as email or text message.

Whether or not a network connection was available (268), in some implementations, the method 250 returns to monitoring for motion alerts (258) and/or lost signals (266) from the MDMs.

Although described as a particular series of operations, in other implementations, steps of the method 250 may be performed in a different order, or certain steps may be performed in parallel. For example, in other implementations, the alert is provided to the management application (264) at the same time that the audible alert is activated on the CCM (262). In another example, in further implementations, the method 250 may monitor for motion alerts (258) before or in parallel with monitoring for lost signals from one or more MDMs (266).

Additionally, one or more steps may be removed or added without altering the intent of the method 250. For example, in other embodiments, whenever an alert or unresponsiveness notification fails to be issued due to network unavailability (260, 268), the alert or unresponsiveness notification is maintained by the application for later transmission (264, 270) to the management application. For example, the method 250 may periodically attempt re-sending the alert or unresponsiveness notification, even after a work period (e.g., when the smart phone returns to cellular service range when driving back from a job site) to ensure the management application is up to date regarding non-compliance events. In an example involving physically connected MDMs, the steps of activating the local network (252) and detecting MDMs in range of the CCM (254) may be removed. Further, the step of receiving the motion alert (258) may involve receiving, via a fiber optic or wired cable, the alert. Other modifications of the method 250 are possible.

Figure 4:
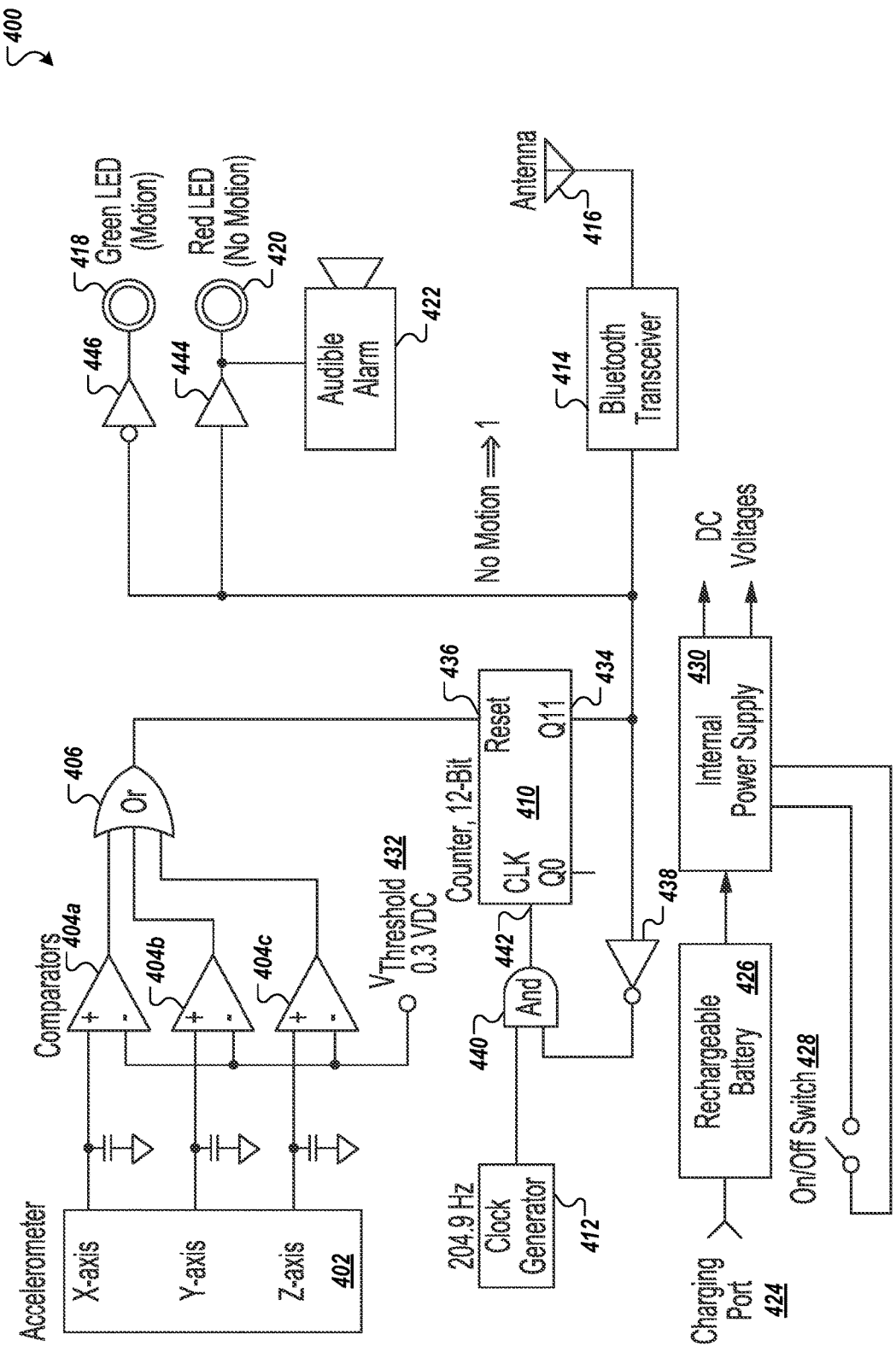
FIG. 4 is a circuit diagram of example circuitry for a motion detection module.

Turning to FIG. 4, a circuit diagram illustrates circuit components of an example Motion Detector Module (MDM) 400. The circuit components present an illustrative design for implementing the components presented in the diagram of the example MDM 300 of FIG. 3 (and/or the MDM 802 of FIG. 8). The MDM 400, for example, includes components appropriate for implementing the MDM 104*a* of FIG. 1A, designed for functionality with the application 116 executing on the portable computing device 114*a* worn or carried by a worker.

The MDM 400, as illustrated, includes a 3-axis accelerometer 402 (e.g., a type of the motion detector 308) with x, y, and z outputs. The 3-axis accelerometer, for example, may be obtained in the form of a commercially available integrated circuit, such as an ADXL335 device manufactured by Analog Devices. The accelerometer, for example, may provide a separate voltage output corresponding to the acceleration in the respective x-axis, y-axis, and z-axis direction. The acceleration, for example, measured in gravitational force (e.g., g-force or g's). In some implementations, the movements of a worker, as translated into corresponding movements of a lifeline attached to the worker's safety harness, typically provide outputs on all three axes. Typical accelerations may be in the range of 0.1 g to 3 g. In the example embodiment using the ADXL335, this acceleration range would provide voltage levels up to approximately 1.5 V. The accelerometer, in some embodiments, is tuned for both gain (or sensitivity) and bandwidth. The tuning characteristics, in one example, may depend in part upon the particular safety equipment being used. For example, a weight of the lifeline, length of the lifeline, and/or connection point of the lifeline to the safety harness may all cause variations in the motions of the lifeline caused by movements of a worker. The gain (sensitivity) and/or bandwidth, in some embodiments, are adjustable based upon the particular safety equipment being used.

As illustrated, the outputs of the accelerometer 402 (i.e., x-axis, y-axis, and z-axis) are provided to a series of comparators 404*a*, 404*b*, and 404*c*, respectively. The comparators 404, for example, may be part of the conditioning circuit 310 of the MDM 300 of FIG. 3. The comparators 404, for example, are each designed to a voltage threshold 432 to reduce vibrational and small movement noise and thereby concentrate on movements corresponding to motions of the worker (e.g., at 0.1 g or greater in the example above). The threshold voltage 432, in some embodiments, is selected to reject very low levels of motion, such as might be encountered if the lifeline the MDM 400 is attached to has been disconnected from the velocity harness and is lying on the roof where it may experience small acceleration forces produced, in some examples, by footsteps from workers, hammering, wind, or other extraneous forces. The threshold voltage 432 may be on the order of about 0.3 VDC, although the value in each of at least one axis or across all axes may be varied to provide improved noise immunity or other performance enhancements.

Figure 5:
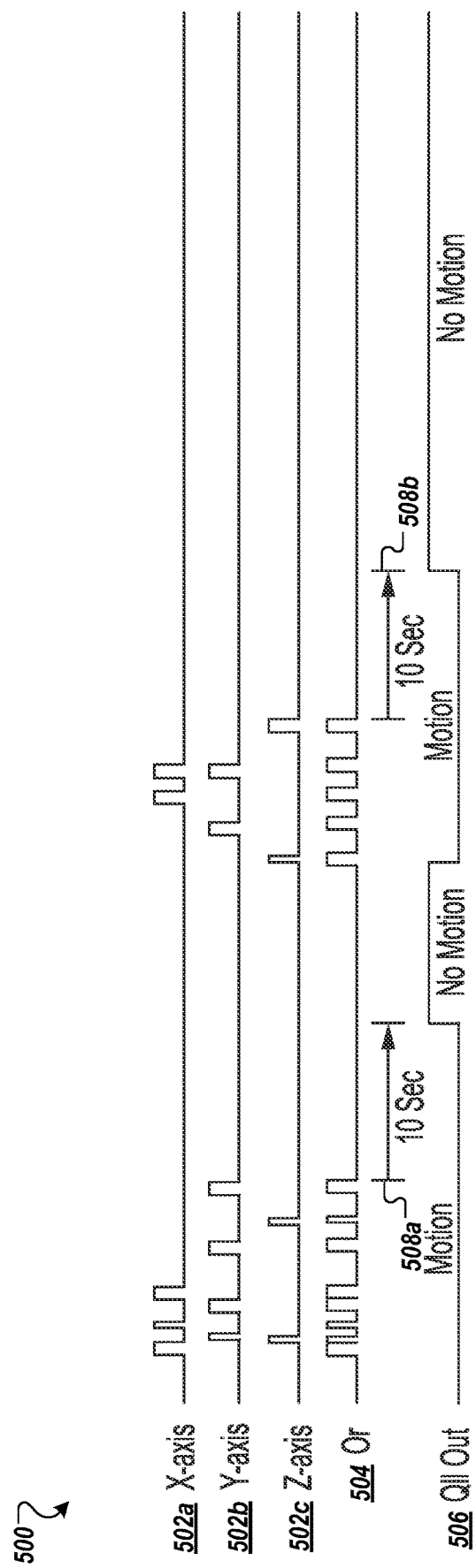
FIG. 5 is an example timing diagram for motion detection in a motion detection module.

Each comparator 404 provides a pulse output when the analog accelerometer voltage exceeds the voltage threshold 432. Turning to FIG. 5, an example timing diagram 500 illustrates a series of pulses representing motion outputs for each of an x-axis 502*a*, a y-axis 502*b*, and a z-axis 502*c* sensor circuitry portion (e.g., outputs of the accelerometer 402 as thresholded by the comparators 404). Thus, as illustrated, pulses in each of the x-axis 502*a*, y-axis 502*b*, and z-axis 502*c* graphs signifies that motion is present, whereas the absence of pulses indicates that motion is not present (e.g., motion may be present in the lifeline, but the threshold voltage, such as a threshold voltage 432 provided to the comparators 404 of FIG. 4, rejects low levels of motion). During the course of a typical workday, it is expected that there will be periods of motion caused by the normal work process, interspersed with periods of no detected motion, as shown in FIG. 5.

Returning to FIG. 4, in some implementations, the conditioning circuit 310 of FIG. 3 may further include an OR gate 406 to select when any of the comparators 404 has detected a motion output greater than the threshold voltage 432. This is represented in the timing diagram 500 of FIG. 5 by the "OR" timing graph 504. In this manner, as long as a threshold level of motion is detected in at least one direction, an indication of motion is output by the OR gate 406.

Next, the indication of motion in at least one axis is provided to a counter 410 (e.g., of the conditioning circuit 310) to monitor for a lack of motion during a threshold period of time. For example, pauses in motion are common, as illustrated in the "OR" timing graph of FIG. 5. However, a sufficient length of time without significant motion (e.g., without motion having a g-force exceeding the threshold voltage level 432) may be indicative of the worker having removed the lifeline. As illustrated, the counter (e.g., a 12-bit counter) is driven by a clock generator 412. The clock generator 412 may run at a constant frequency, for example, of 204.9 Hz.

In the illustrative embodiment, output Q11 434 of the counter 410 divides the frequency of the clock generator 412 by 4096, which means that the Q11 output 434 will transition from "0" to "1" after 2048 clock pulses, providing a time delay of 10 seconds unless the counter 410 is reset. In other embodiments, different threshold periods of time may be used. A reset input 436 of the counter 410 is connected to the output of the OR gate 406 such that, if any significant motion is detected by the accelerometer 402 (e.g., motion significant enough to be above the threshold voltage 432 applied to the comparators 404), the 10 second count is reset. Therefore, if no pulses are received from the OR gate 406, a positive voltage (e.g., "1") will be provided at the output Q11 434.

In the illustrative embodiment, the output Q11 434 is fed back to the counter 410 to inhibit further counting at this point. For example, the "1" from the output Q11 434 is supplied to an inverter 438, translating the positive output to a "0" which is fed into an AND gate 440 along with the output of the clock generator 412, thereby nullifying a clock input 442 at the counter 410. Therefore, as long as the output Q11 434 remains at a high value (e.g., "1"), the counter 410 remains in a "no motion" state. The "no motion" state will continue until the OR gate 406 supplies a positive value representing significant motion detected at the accelerometer 402, thereby resetting the counter 410 (e.g., via the reset input 436 of the counter 410).

During the "no motion" state, while the Q11 output 434 of the counter 410 is high, in the illustrative embodiment, the output of the counter 410 triggers an audible alarm 422 and a "no motion" (e.g., red) status indicator lamp 420 (e.g., light emitting diode (LED)). The output of the audible alarm 422 and/or the "no motion" status indicator lamp 420 may be signified using a buffer 444. For example, the audible alarm 422 may issue a loud tone, while the "no motion" status indicator lamp 420 remains a solid visual color. Conversely, the buffer 444 may be replaced by a modulating circuit. In the alternative implementation, the output of the audible alarm 422 may emit a beeping sound or a modulating louder/software tone. Similarly, the "no motion" indicator lamp 420 may be modulated to blink on and off (or brighter and dimmer). In further examples, the audible alarm 422 may include a speaker fed by alarm circuitry configured to issue a series of tones, an intermittent tone (e.g., "beep") or even a verbal command (e.g., "connect line to harness").

Further, during the "no motion" state, while the Q11 output 434 of the counter 410 is high, in the illustrative embodiment, a short-range wireless transmitter 414 (illustrated as a Bluetooth transceiver 414) is enabled by the "high" value of the Q11 output 434 tied directly to the Bluetooth transceiver 414 (e.g., to an enable gate). The Bluetooth transceiver 414, when enabled, issues a signal via an antenna 416, such as an internal RF antenna of the MDM 400. The Bluetooth transceiver 414 may be configured to issue a unique identifier associated with the MDM 400, such that multiple MDMs at a job site are individually identifiable. In other embodiments similar to the system 100 of FIG. 1A, a range of the antenna 416 is configured to be likely to only receive signals from the MDM of an application installed on the worker's cell phone rather than other nearby MDMs.

In the illustrative embodiment, once the OR gate 406 again issues an output "high" indicative of significant motion detected by the accelerometer 402 in one or more axes, the counter 410 is reset via the reset input 436, the Q11 output 434 returns to "low", and the clock input 442 is enabled by the NOT gate 438 reversing the "low" output from Q11 and thereby feeding a "high" value into the AND gate 440. Further, the Q11 output 434, tied to the Bluetooth transceiver 414, disables the RF transmission by the antenna 416. The "low" Q11 output 434 further disables the audible alarm 422 and the "no motion" indicator lamp 420.

During the "motion" state, in the illustrative embodiment, the Q11 output 434 is further provided to a "motion" indicator lamp 418 via a NOT gate 446 (e.g., a green LED) to provide a status indication that the MDM 400 is active and motion is being detected.

Turning to FIG. 5, a Q11 Out graph 506 illustrates changes between motion and no motion, each swap to "no motion" being triggered by a threshold period of time 508a, 508b (e.g., ten second delay) counted by the counter 410 of lack of significant motion as detected by the accelerometer 402.

Similar to the MDM 300 of FIG. 3, in the illustrated embodiment, the example MDM 400 is powered by a rechargeable battery 426. A charging port 424 (e.g., universal serial bus (USB) port, mini USB port, or microUSB port, etc.) provides a conduit for charging the rechargeable battery 426. The rechargeable battery 426, in turn, supplies power to an internal power supply 430. In some embodiments, the rechargeable battery 426 is a 3.7V 18650 lithium ion battery or a 3V lithium coin cell battery. In other embodiments, removable batteries, such as two or three AA or AAA batteries or a single 9 V battery, may be included in the example MDM 400. In further embodiments, charging may be achieved or supplemented using a solar charging unit disposed on a surface of the MDM 400. For example, the small solar array may receive charging during operation since the worker is positioned on a rooftop, oftentimes in full sun.

Although the conditioning circuit (e.g., comparators 404, OR gate 406, counter 410, NOT gate 438, AND gate 440, and clock generator 412) illustrated in the circuit diagram of the example MDM 400 is embodied in digital hardware, in other embodiments, the functionality described above may be implemented using a digital processor and software, a programmable logic device (PLD), or an application-specific integrated circuit (ASIC) to achieve similar results. In embodiments using a software-configurable hardware logic implementation, customizations may be available to the end user (e.g., contractor) for programming movement threshold(s), period of time for lack of motion, and/or output parameters (e.g., alarm tone(s) or no tone, indicator lamp settings, information transmitted by the Bluetooth transceiver 414, etc.). These customizations, for example, may be implemented through a communication connection with the charging port 424 and/or via wireless communications with the Bluetooth transceiver 414. The management application, as described in relation to FIGS. 1A, 1B, and 1C, in some embodiments, may be configured to supply settings information to one or more MDMs.

In some implementations, rather than supplying an analog output, the 3-axis accelerometer may be a 3-axis accelerometer MEMS integrated circuit (IC) with an internal A/D converter to provide digital outputs. The digital outputs, for example, may be in PC format. When using a motion sensor, such as an accelerometer and/or gyroscope including a built-in A/D converter, the conditioning circuit may be replaced with a processor programmed to determine whether the digital outputs of the accelerometer and/or gyroscope are indicative of worker motion. An example circuit layout including motion sensors with digital outputs is discussed in greater detail below in reference to FIG. 8.

In further embodiments, the conditioning circuit of the MDM 400 is configured to monitor a state of charge of the rechargeable battery 426. The MDM circuitry, for example, may be designed to calculate an estimated remaining operating period of the MDM 400. Further, the transmission supplied by the Bluetooth transceiver 414, in some implementations, provides a charge indication in the event of a low charge state. In another example, the alarm 422 may be configured to issue a warning tone at a low battery threshold, and/or a further indicator lamp (e.g., a yellow "low charge" indicator lamp or series of indicator lamps illustrating estimated charge level) may be provided to present a visual indication of current charge of the MDM 400.

Figure 6:
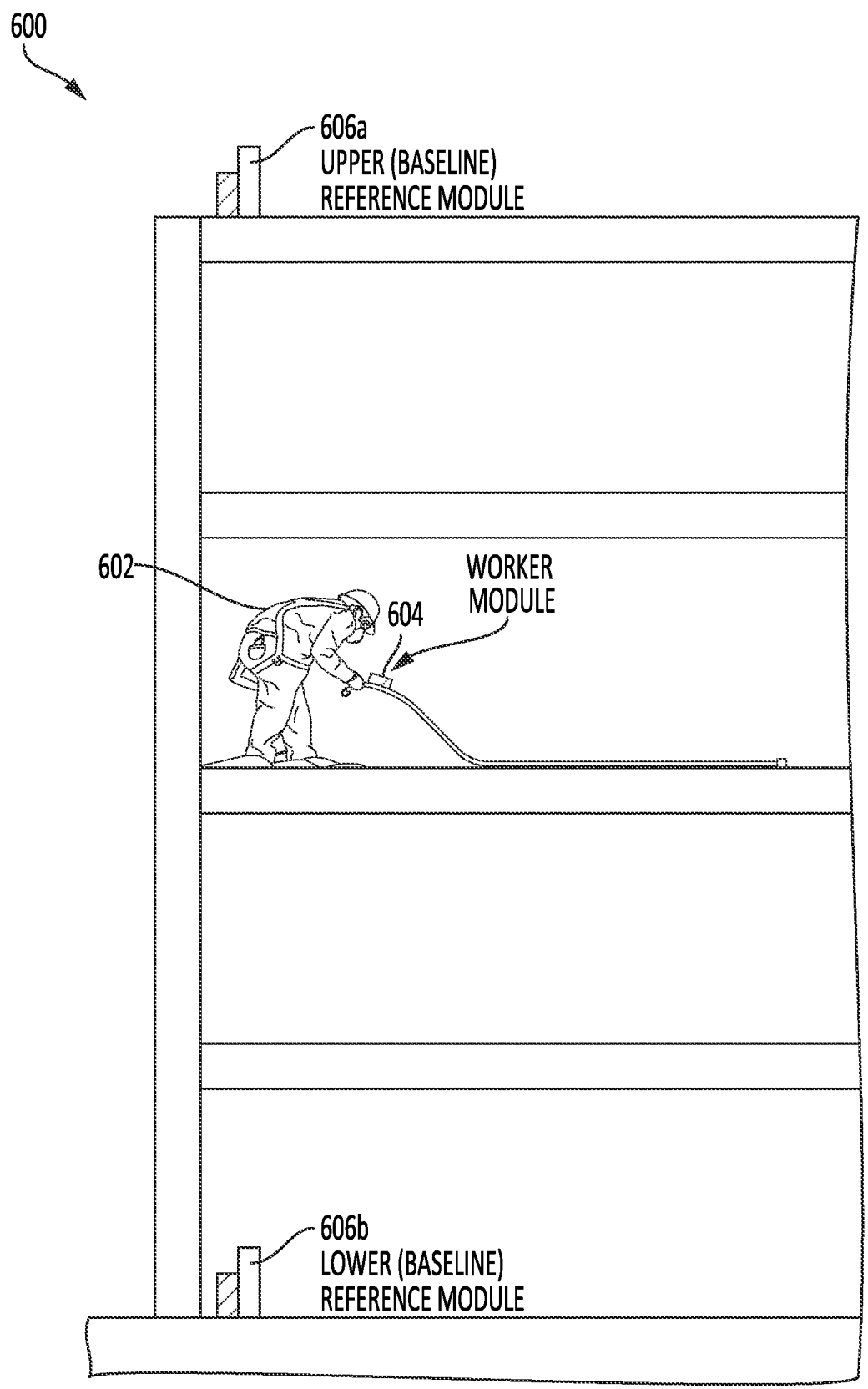
FIG. 6 is a block diagram of an example system for monitoring elevation of one or more construction workers at a job site.

Turning to FIG. 6, in some implementations, a system 600 for monitoring safety apparel compliance in a construction worker 602 using a motion detection module (MDM) 604 attached to a component of the safety apparel is designed to monitor an elevation of the worker, for example by determining which floor (e.g., including the roof) the construction worker 602 is working on at a multi-story job site. To monitor elevation, the MDM 604 may include barometric pressure sensing circuitry and/or positioning circuitry such as GPS circuitry configured to determine a current elevation of the worker 602. Example circuitry is illustrated in FIG. 8, discussed in greater detail below.

As illustrated, in some implementations, to monitor the worker's elevation, an upper reference module 606a is positioned at an upper position of the structure (e.g. top floor or roof) and a lower reference module 606b is positioned at a lower position of the structure (e.g., ground floor). The reference modules 606 may be designed with the same circuitry as the MDM 604 or may include a simplified version of the circuitry as the MDMs 604. In some embodiments, one or both of the reference modules 606 includes the circuitry of a Central Communication Module (CCM) 114b (e.g., such as the CCM 114b of FIG. 1B or the CCM 182a, 182b of FIG. 1C). The reference modules 606, for example, may collect reference barometric pressure measurements and/or reference positioning measurements for use in refining measurements collected by the MDM 604.

In some implementations, the reference modules 606 are configured to collect barometric pressure measurements using a MEMS barometric pressure sensor, such as the LPS22HD piezoresistive absolute pressure sensor by STMicroelectronics of Geneva, Switzerland. For changes in elevation or altitude of less than several hundred feet, the relationship between elevation and altitude is approximately linear. For example, at altitudes close to sea level, a change in elevation of approximately 29 feet provides a change in pressure of approximately 1 mbar (also described as 1 hPa). However, a large potential offset error is present, due to the constant changes in barometric pressure from atmospheric effects, such as weather change. As the atmospheric pressure varies, there will be substantially equal variations in the measurements taken by the reference modules 606 and the MDM 604. Thus, by calibrating the MDM 604 in view of the base measurements taken at the known elevations of the reference modules 606, the atmospheric effect offset error may be nullified. Further, the elevation of the MDM 604 may be calculated by comparing the pressure measurement obtained by the MDM 604 to the pressure measurements obtained by the two reference modules 606.

Figure 7:
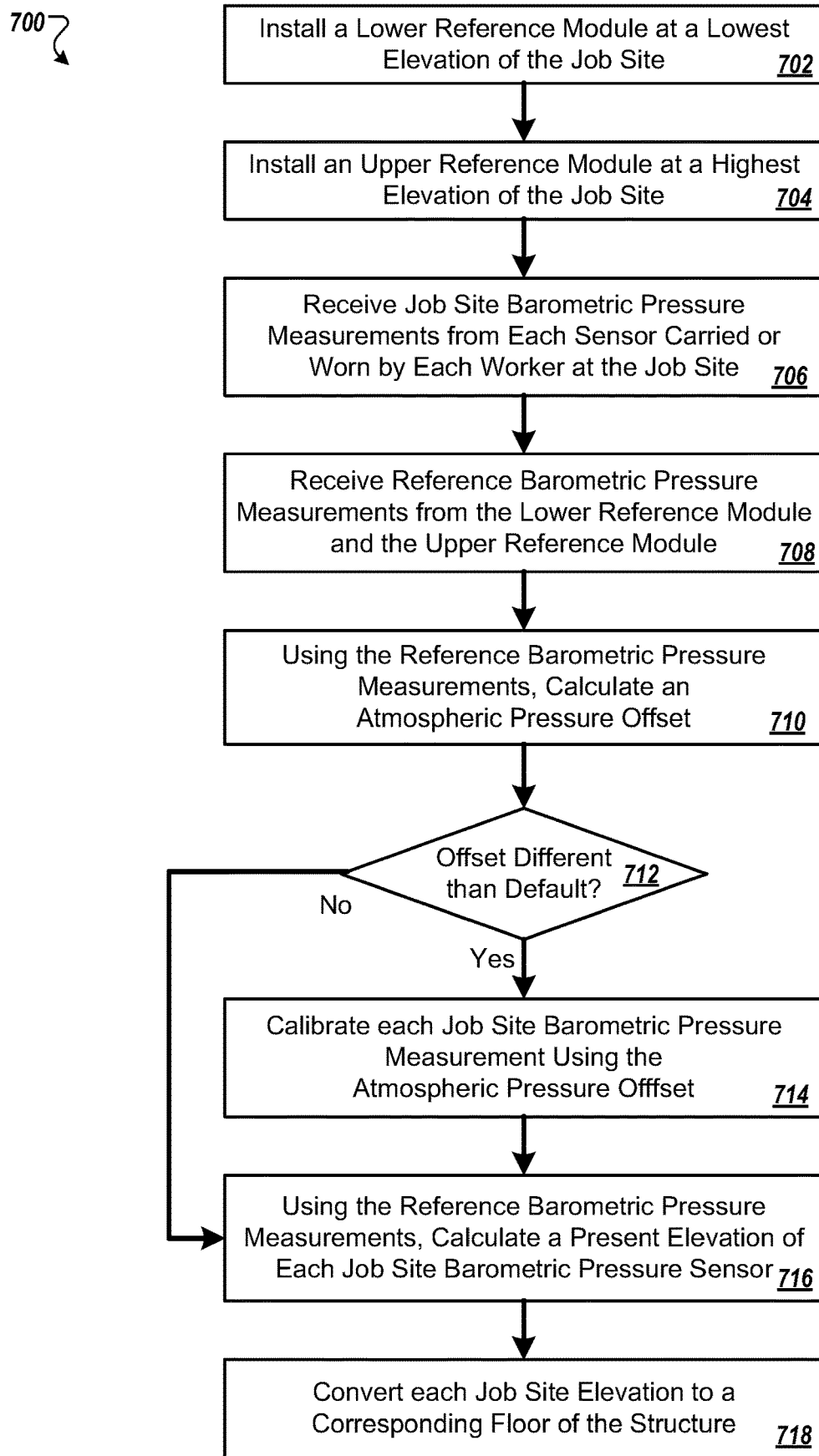
FIG. 7 is a flow chart of an example method for determining elevation of one or more construction workers at a job site.

Turning to FIG. 7, an example method 700 for determining elevation of a construction worker using barometric pressure measurements is presented in a flow chart. The method 700, for example, may be performed by a central communication module such as the CCM 114b of FIG. 1B or the CCM 182a of FIG. 1C, a barometric pressure measuring reference module such as the reference modules 606a, 606b of FIG. 6, or a central application such as the worksite monitoring application 172 described in relation to FIG. 1C. A portion of the method 700 may be performed using a motion detection module (MDM), such as an MDM 802 of FIG. 8. The method 700 may be performed on a periodic basis. The time period, in some examples, may be about every 2 minutes, about every 3 minutes, or between 3 minutes and 5 minutes. In other examples, the time period may be around 10 minutes, between ten minutes and 15 minutes, or after 15 minutes. The time period, in some embodiments, is a user-configurable parameter. For example, a contractor or manager may choose a reasonable period of time for monitoring which floor a construction worker is working on.

In some implementations, the method 700 begins with installing a lower reference module at a lowest elevation of the job site (702). In some examples, this may be a ground floor, a ground surface (e.g., where the ground elevation is parking and/or open space with the building positioned on top of the parking/open area), or a "walk out basement" floor where the construction is built into the side of a hill. The lower reference module, for example, may include at least a portion of the circuitry of the MDM 802 of FIG. 8.

In some implementations, an upper reference module is installed at a highest elevation of the job site (704). The highest elevation, for example, may be a top floor or a rooftop of the job site. As construction proceeds and additional floors are added, in some embodiments, the upper reference module may be moved and/or another reference module may be added. The upper reference module, for example, may include at least a portion of the circuitry of the MDM 802 of FIG. 8.

In certain embodiments, a reference module is provided at every $N^{th}$ floor and/or at every $N^{th}$ elevation (e.g., feet, meters) from a below reference module. For example, one or more floors may be interpolated with reasonable accuracy, but this accuracy may not be achieved reliably across more than a certain number of floors (e.g., greater than one interpolated floor, greater than two interpolated floors, greater than three interpolated floors, etc.). An illustrative example, provided in the table below, demonstrates the number and potential placement of reference modules per building height if the desired accuracy leads to a maximum of two interpolated floors between reference modules. The placement can depend in part upon the height of the various floors. For example, in a hotel with a two-story lobby region on the first floor, the next reference module may be placed at the second or third floors (e.g., elevation-wise the third and fourth floor height).

TABLE 1

| Number of Floors | Floor 1 | Floor 2 | Floor 3 | Floor 4 | Floor 5 | Floor 6 | Floor 7 | Floor 8 |
|---|---|---|---|---|---|---|---|---|
| 1 | | | | | | | | |
| 2 | X | X | | | | | | |
| 3 | X | | X | | | | | |
| 4 | X | | | X | | | | |
| 5 | X | | X | | X | | | |
| 6 | X | | | X | | X | | |
| 7 | X | | | X | | | X | |
| 8 | X | | | X | | X | | X |

In some implementations, job site barometric pressure measurements are received from each sensor carried or worn by each worker at the job site (706). The sensor, for example, may be built into an MDM such as the MDM 802 of FIG. 8. The barometric pressure measurements, for example, may be measured by a barometer 826 of FIG. 8. The processing circuitry 810 of the MDM 802 of FIG. 8, for example, may collect barometric pressure measurements and supply the measurements externally via the RF transceiver 816 and RF antenna 818. The barometric pressure measurements, for example, may be collected periodically (e.g., at least once per minute, at least once per every five minutes, about 4 or 5 times per hour, etc.). The barometric pressure measurements, for example, may be transmitted along with an identification of each device (e.g., motion detection module (MDM)). The identification, for example, may be provided by a module ID unit 828 of the MDM 802, as illustrated in FIG. 8. In some embodiments, additional information is provided with the barometric pressure measurements such as, in some examples, a timestamp, a temperature, and/or a position (e.g., job site indicator, GPS measurement, etc.). The temperature, for example, may be measured by the barometer/temperature sensor 826 of MDM 802 of FIG. 8 and position measurements may be provided by a GPS location processor 824 of the MDM 802 of FIG. 8.

In some embodiments, a set of barometric measurements is received and processed to determine a sample barometric pressure measurement. The sample barometric pressure measurement, in some examples, represents a combination of the set of barometric pressure measurements (e.g., average, mean, median, etc.). In some examples, the set of barometric pressure measurements are processed to remove outlier data (e.g., linear regression, removal of readings X psi away from a median barometric measurement, etc.). In other embodiments, the processing circuitry 810 may combine pressure measurements prior to transmission during periodic collection.

In some implementations, reference barometric pressure measurements are received from the lower reference module and the upper reference module (708). The reference barometric pressure measurements may be measured by the MEMS barometer, which, for example, has a rated absolute accuracy of 0+/−0.1 mbar (2.9 ft). In addition to reference barometric pressure measurements, in some embodiments, the upper and lower reference modules provide additional information such as, in some examples, location information, identification information, a temperature measurement, a timestamp, and/or battery charge information. The reference barometric pressure measurements may be issued periodically, for example every 15 seconds, at least once per minute, at least once every 5 minutes, one to four times per hour, or at least once per hour. In another example, the reference barometric pressure measurements may be issued responsive to receiving at least one transmission from a motion detector module (MDM) or other device carried by a worker. Further to this example, while no workers are active on a site, the lower reference module and the upper reference module may conserve battery by ceasing communications. The lower reference module and the upper reference module, in this example, may transmit reference barometric pressure measurements on a same period as the sensor carried or worn by the worker.

In some embodiments, a frequency of transmission is established to conserve battery so that the lower reference module and upper reference module seldom require charging (e.g., about every other day, about every three days, about once per week, etc.). The frequency, in some examples, may depend on the amount of energy required to transmit measurements, the battery capacity, the type of wireless transmitter (e.g., BlueTooth, Wi-Fi, CAT M1, etc.), and/or the operating distance of the wireless transmitter. Thus, several factors may contribute to identifying a transmission frequency and/or charging frequency. The transmission frequency and/or operating distance (e.g., operating mode), in some embodiments, may be at least in part user selectable.

In some implementations, an atmospheric pressure offset is calculated using the reference barometric pressure measurements (710). As the atmospheric pressure at the job site varies due to changes in the weather, this will cause equal variations in the measurements in the reference modules as well as the worker MDMs. Thus, the drift components may be removed through identifying a common drift within the reference barometric pressure measurements.

In some implementations, if the atmospheric pressure offset is different than a default offset (712), each job site barometric pressure measurement is calibrated using the atmospheric pressure offset (714). For example, the MDM barometric pressure measurements may be adjusted by the drift component.

In some implementations, a present elevation of each job site barometric pressure sensor is calculated using the calibrated barometric pressure measurements (716). For changes in elevation or altitude of less than several hundred feet, the relationship between elevation and altitude is approximately linear. For example, at altitudes close to sea level, a change in elevation of approximately 29 feet provides a change in pressure of approximately 1 mbar (i.e., 1 hPa).

In some implementations, each job site elevation is converted to a corresponding floor of the job site structure (718). As a worker moves from one floor to another, the measured barometric pressure of the worker's MDM will vary accordingly at about a rate of 0.1 mbar for each 2.9 feet. Thus, with knowing the number of feet between each floor (e.g., based upon wall heights per floor) and the ground reference elevation, the elevation measurements may be converted to a floor.

Figure 9:
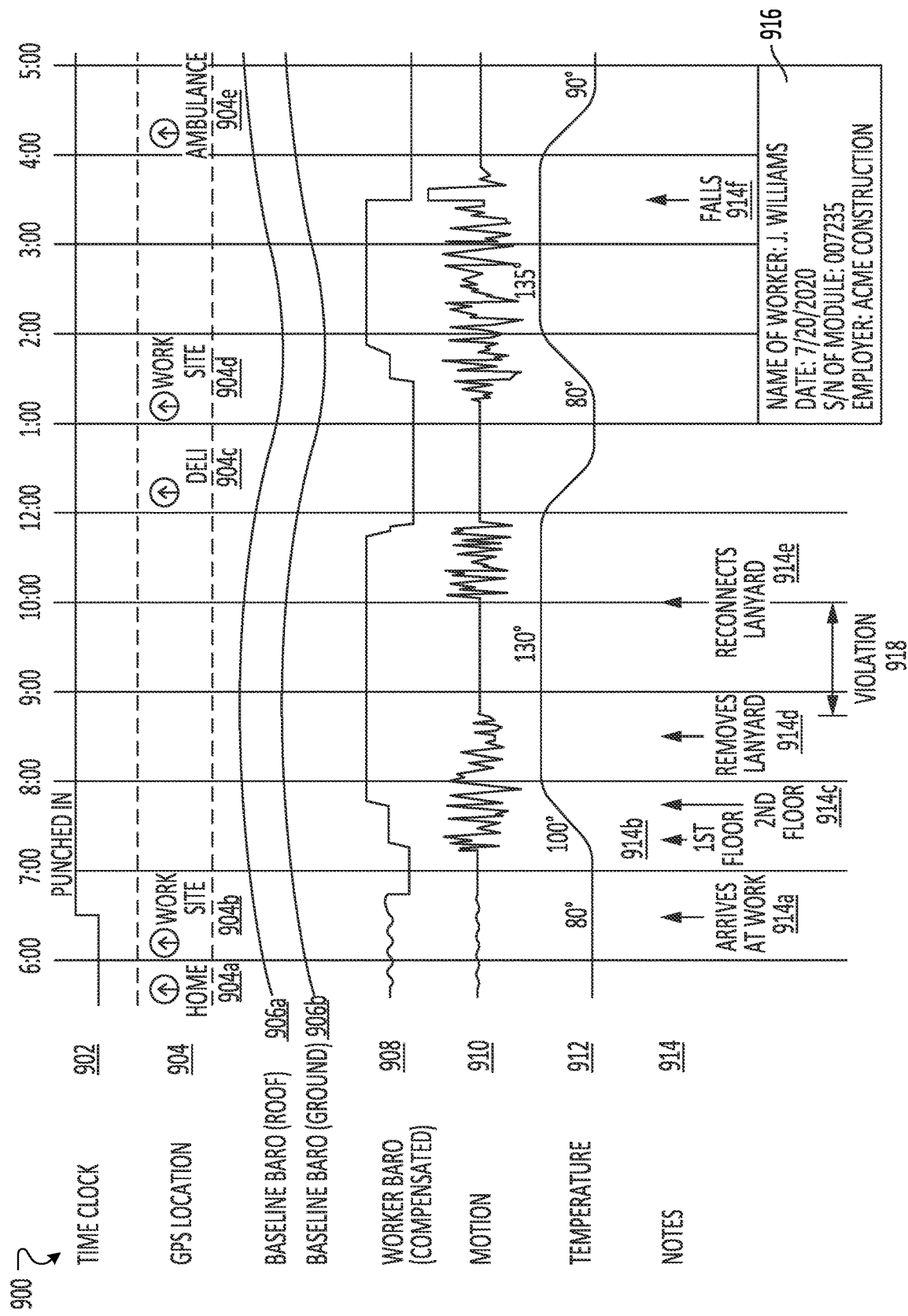
FIG. 9 is a diagram representing example measurements collected in relation to a worker during a day of work.

Although described as a particular series of operations, in other implementations, there may be more or fewer operations. For example, reference pressures may be calculated based upon a series of measurements obtained over a threshold time period and then used to calibrate (714) each job site barometric pressure measurement. In another example, rather than using just the lower reference module and the upper reference module to calculate the atmospheric pressure offset (710), the offset may be derived from a series of reference measurements taken from reference modules distributed at intermediate floors as well, as described above in relation to table 1. Further, in certain implementations, the job site elevations may not be converted to a corresponding floor (718). For example, in the circumstance of a tower or other structure lacking distinct floors (e.g., Statue of Liberty, Eiffel Tower, Space Needle, etc.), the elevation may be tracked rather than floor of a building. Other modifications of the method 700 are possible. FIG. 9 is a diagram 900 representing example measurements collected in relation to an individual wearing an MDM during a day of work, illustrated on a timeline of 6:00 AM to 5:00 PM. Portions of the diagram 900, for example, may be available to a supervisor or contractor. For example, a portion of the contents of the diagram 900 may be presented by the worksite monitoring application 124 described in relation to FIG. 1A and FIG. 1B or the worksite monitoring application 172 described in relation to FIG. 1C. As illustrated, the diagram 900 illustrates a worker time clock graph 902, a location graph 904, an upper baseline barometric measurement graph 906*a*, a lower baseline barometric measurement graph 906*b*, a MDM barometric measurement graph 908, an MDM motion measurement graph 910, and a temperature graph 912. The diagram 900 further includes a series of notes 914 identifying events corresponding to changes in various graphs 902, 904, 906, 908, and 910. In the lower right corner, an identification block 916 identifies the worker as J. Williams, the date as Jul. 20, 2020, the serial number of the MDM as 007235, and the employer as Acme Construction.

As identified by the notes 914, the worker arrives at work 914*a* and punches in with the time clock (902) at the work site (location 904). The MDM is connected to a lifeline prior to about 7:30 AM, as illustrated by the motion graph 910. Based on the upper baseline barometric measurement 906*a*, the lower baseline barometric measurement 906*b*, and the worker barometric measurement 908, the worker begins the workday on the first floor of the work site (914*b*).

The worker moves to the second floor of the worksite prior to 8:00 AM (914*c*). The worker MDM barometric measurements on the worker barometric measurement graph 908, for example, have been compensated with the two corresponding baseline barometric measurements 906*a*, 906*b*, thus demonstrating a step movement in barometric pressure when relocating from the first floor of the worksite to the second floor of the worksite.

As evidenced by the motion graph 910, at about 8:45 AM the worker releases the lifeline (914*d*) resulting in a period of violation 918 between about 8:45 AM and about 10:00 AM until the motion graph 910 once again registers motion of the MDM (914*e*). The lack of motion reading 910 may result in an alert presented or transmitted (e.g., via text, email, indication within the screen of the worksite monitoring application, etc.) to the supervisor or contractor so that the worker's safety violation may be corrected.

Between about 12:00 PM and about 1:30 PM, no motion is registered on the motion graph 910. However, according to the location graph 904, this is because the worker is at a restaurant location 904*c* on lunch break. Based upon the location 904*c*, the lack of motion, in some embodiments, does not result in an alert.

The worker resumes work around 1:30 PM, indicated by both the location 904*d* and the motion registered on the motion graph 910. At about 3:30 PM, a motion anomaly occurs on the motion graph 910, corresponding to a fall (914f). At about 4:15 PM, the worker is en route to a hospital in an ambulance 904e, as indicated on the location graph 904.

Reference has been made to illustrations representing methods and systems according to implementations of this disclosure. Aspects thereof may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors, for example on one or more physical computing systems such as a computer farm or a cloud drive.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations. The hardware logic may be synthesized on a reprogrammable computing chip such as a field programmable gate array (FPGA), programmable logic device (PLD), or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable performance of the methods described in relation to FIGS. 2A-2C.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi, Bluetooth, Zigbee, or another wireless form of communication. The network, for example, may be the network 180 as described in relation to FIG. 1C.

The computing device, such as the portable computing devices 114a, 114b and 120 of FIGS. 1A and 1B, and/or the computing device 174 of FIG. 1C, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display.

A sound controller, in some embodiments, is also provided in the computing device, such as the computing devices 114a, 114b and 120 of FIGS. 1A and 1B, and/or the computing device 174 of FIG. 1C, to interface with speakers/microphone thereby providing audio input and output.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Certain functions and features described herein may also be executed by various distributed components of a system. For example, one or more processors may execute these system functions, where the processors are distributed across multiple components communicating in a network such as the network 180 of FIG. 1C. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™, may be used to perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google Cloud Storage, may store processed and unprocessed data supplied by systems described herein.

The systems described herein may communicate with the cloud computing environment through a secure gateway. In some implementations, the secure gateway includes a database querying interface, such as the Google BigQuery platform.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for verifying a worker positioned on a building structure is compliant in wearing necessary safety equipment, wherein the safety equipment comprises
   a safety harness configured to be worn by the worker, and
   a lifeline assembly comprising an anchor tether configured to releasably connect the safety harness to an anchoring point on the building structure,
   the system comprising:
   a motion detector module configured to identify movement of the worker indicative of attachment of the safety harness of the worker to the anchor tether of the lifeline assembly, the motion detector module comprising a housing, wherein the housing contains
      a motion sensor configured to detect motion of the safety harness and/or anchor tether,
      conditioning circuitry configured to detect, from signals provided by the motion sensor, motions indicative of movement of the worker, and
      timing circuitry configured to determine a length of time between significant motions indicative of movement of the worker, and
      a communications transceiver; and
   a non-transitory computer readable medium having instructions stored thereon, wherein the instructions, when executed by processing circuitry, cause the processing circuitry to
      receive, from the communications transceiver, a plurality of signals related to detection of motions indicative of movement of the worker and/or the length of time between motions indicative of movement of the worker, and
      translate one or more of the plurality of signals into motion information, the motion information comprising information indicative of compliance or noncompliance of the worker with wearing necessary safety equipment.

2. The system of claim 1, wherein the instructions stored on the non-transitory computer readable medium cause the processing circuitry to forward, to a worksite monitoring application executing on a remote computing device, the motion information.

3. The system of claim 1, wherein the motion detector module is configured for attachment to the anchor tether.

4. The system of claim 1, wherein the communications transceiver is a Wi-Fi transceiver.

5. The system of claim 1, wherein the instructions form part of an application installed on a portable computing device carried by the worker.

6. The system of claim 5, wherein the communications transceiver transmits the plurality of signals to the portable computing device via a Bluetooth connection.

7. The system of claim 1, wherein the motion detector module further comprises alarm circuitry configured to, responsive to the timing circuitry detecting the length of time between the significant motions indicative of the movement of the worker equal to or greater than a threshold period of time, activate an audible alarm emanating from the housing of the motion detector module.

8. The system of claim 1, wherein:
   receiving the plurality of signals comprises receiving via a first communication protocol; and
   forwarding the plurality of signals comprises forwarding via a second communication protocol.

9. The system of claim 8, wherein the second communication protocol is a cellular communication protocol.

10. The system of claim 1, wherein the processing circuitry is configured to receive, from a plurality of motion detector modules including the motion detector module, respective motion information of a plurality of respective workers, wherein each motion detector module communicates a separate motion detector module identifier.

11. The system of claim 10, wherein each of the plurality of motion detector modules is configured to monitor motion of a respective worker of the plurality of respective workers positioned on one or more building structures at a construction site.

12. A method for monitoring safety compliance by a worker positioned on a building structure, the method comprising:
   providing a safety harness configured to be worn by the worker;
   providing a lifeline assembly comprising an anchor tether configured to releasably connect the safety harness to an anchoring point on the building structure;
   providing a motion detector module comprising:
      a motion sensor configured to detect motion in the safety harness and/or the anchor tether,
      detection circuitry configured to detect, from motion signals provided by the motion sensor, motions indicative of movement of the worker,
      a timer module configured to determine a lack of motions indicative of movement of the worker over a threshold period of time, wherein
         determining the lack of motions indicative of movement of the worker over the threshold period of time is indicative of noncompliance with connection of the safety harness to the anchor tether, and
      a communications transceiver,
   monitoring, by processing circuitry of a computing device, signals from the communications transceiver to determine safety compliance of the worker, wherein monitoring comprises receiving, from the communications transceiver, a plurality of signals relating to the detection of motions indicative of movement of the worker and/or lack of motions indicative of movement of the worker, and
      deriving safety compliance information from the plurality of signals.

13. The method of claim 12, further comprising forwarding, by the processing circuitry to a worksite monitoring application executing on a remote computing device, the safety compliance information.

14. The method of claim 12, wherein the motion detector module is arranged on the anchor tether.

15. The method of claim 12, wherein the portable computing device is a central communications module positioned at a job site and configured to monitor the signals from the communications transceivers of a plurality of motion detector modules.

16. The method of claim 12, wherein the central communications module receives the signals from the communications transceivers via a plurality of wired connections.

17. The method of claim 12, further comprising activating, by the processing circuitry, at least one of an audible alarm or a visual alarm responsive to motion information indicating the anchor tether is unattached to the lifeline assembly of the harness worn by the worker.

18. A system for monitoring attachment of a safety harness worn by a worker to a lifeline assembly positioned on a building structure, the system comprising:
   a motion detector module for monitoring motion of a worker wearing a harness comprising a lifeline strap configured for releasable attachment to an anchor tether, the motion detector module comprising a housing, wherein the housing contains
      a motion sensor,
      conditioning circuitry configured to detect, from signals provided by the motion sensor, motions indicative of movement of the worker,
      timing circuitry configured to determine a length of time between motions indicative of movement of the worker, and
      a radio frequency transceiver, wherein
   the anchor tether is configured to releasably connect to an anchoring point on a building structure; and
   a software application for installing on a portable computing device, the software application configured to, upon execution by processing circuitry of the portable computing device,
      receive, from the radio frequency transceiver, a plurality of signals related to detection of motions indicative of movement of the worker and/or the length of time between motions indicative of movement of the worker, and
      process one or more of the plurality of signals into motion information, wherein at least a portion of the motion information is indicative of the attachment or non-attachment of the lifeline strap of the harness worn by the worker to the anchor tether.

19. The system of claim 18, wherein the software application is configured to activate, responsive to the motion information indicating the non-attachment of the anchor tether to the lifeline strap, an alert on the portable computing device, wherein
   the alert comprises at least one of an audible, visible, or tactile alarm configured to draw attention to the portable computing device by the worker or another individual at a job site.

20. The system of claim 19, wherein the software application is further configured to, after activating the alert, forward, via a network, a management alert to a remote computing system.

* * * * *